(12) United States Patent
Borrelli et al.

(10) Patent No.: US 11,137,539 B2
(45) Date of Patent: Oct. 5, 2021

(54) MULTICORE RING FIBERS FOR QUANTUM SYSTEMS, AND SUCH SYSTEMS

(71) Applicant: CORNING INCORPORATED, Corning, NY (US)

(72) Inventors: Nicholas Francis Borrelli, Elmira, NY (US); Rostislav Radiyevich Khrapko, Corning, NY (US); Dan Trung Nguyen, Painted Post, NY (US); Thien An Thi Nguyen, Mountain View, CA (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/034,014

(22) Filed: Sep. 28, 2020

(65) Prior Publication Data
US 2021/0103090 A1    Apr. 8, 2021

Related U.S. Application Data

(60) Provisional application No. 62/912,414, filed on Oct. 8, 2019, provisional application No. 62/912,426, filed on Oct. 8, 2019.

(51) Int. Cl.
*G02B 6/02* (2006.01)
*G02B 6/36* (2006.01)

(52) U.S. Cl.
CPC ..... *G02B 6/02042* (2013.01); *G02B 6/02361* (2013.01); *G02B 6/3684* (2013.01)

(58) Field of Classification Search
CPC ............ G02B 6/02042; G02B 6/02361; G02B 6/3684
See application file for complete search history.

(56) References Cited

U.S. PATENT DOCUMENTS

9,484,706 B1 * 11/2016 Koponen ............ H01S 3/06708
2002/0181868 A1    12/2002 McGreer
(Continued)

FOREIGN PATENT DOCUMENTS

CN    107357112 A    11/2017

OTHER PUBLICATIONS

Bromberg et al., "Quantum and Classical Correlations in Waveguide Lattices", PRL 102, 253904 (2009).
(Continued)

*Primary Examiner* — Sung H Pak
(74) *Attorney, Agent, or Firm* — Svetlana Short

(57) ABSTRACT

A multicore optical fiber that includes a plurality of waveguiding cores disposed in a cladding. The plurality of waveguiding cores include one or more first waveguiding cores that have a first propagation constant and one or more second waveguiding cores that have a second propagation constant, where the first propagation constant differs from the second propagation constant. The one or more first waveguiding cores and the one or more second waveguiding cores are disposed in the cladding in a ring distribution and at least a portion of the ring distribution is arranged based on a quasi-periodic sequence having a plurality of sequence segments. Each sequence segment is determined based on a quasi-periodic function, has an order, and corresponds to an arrangement segment of a first waveguiding cores, a second waveguiding cores, or combinations thereof. The ring distribution includes at least one arrangement segment corresponding with a third-order sequence segment or higher of the quasi-periodic sequence.

20 Claims, 10 Drawing Sheets

(56) References Cited

U.S. PATENT DOCUMENTS

| | | | |
|---|---|---|---|
| 2003/0031438 | A1 | 2/2003 | Kambe et al. |
| 2004/0037505 | A1 | 2/2004 | Michel |
| 2005/0145783 | A1 | 7/2005 | Zheng |
| 2006/0092500 | A1 | 5/2006 | Melloni et al. |
| 2007/0280592 | A1 | 12/2007 | Furuya et al. |
| 2007/0280613 | A1 | 12/2007 | Inoue et al. |
| 2011/0286477 | A1 | 11/2011 | Kuksenkov et al. |
| 2013/0156393 | A1 | 6/2013 | Kokubun et al. |
| 2014/0328556 | A1 | 11/2014 | Rubio et al. |
| 2015/0236791 | A1 | 8/2015 | Nordholt et al. |
| 2017/0160474 | A1 | 6/2017 | Mahmoodian et al. |
| 2017/0293082 | A1 | 10/2017 | Mower et al. |
| 2018/0299613 | A1* | 10/2018 | Nakanishi .......... G02B 6/02014 |
| 2019/0033513 | A1 | 1/2019 | Sasaki et al. |
| 2020/0348463 | A1* | 11/2020 | Mukasa .................. G02B 6/04 |

OTHER PUBLICATIONS

A. Ambainis "Quantum walks and their algorithmic applications". Int. J. Quant. Inf. 1, 507 (2003).

A. Montanaro, "Quantum algorithms: an overview," npj Quant. Inf. 2, 15023 (2016).

Boguslawski et al., "Light localization in optically induced deterministic aperiodic Fibonacci lattices," Optica 3(7), 711-717 (2016).

Chandrashekar et al., "Localized quantum walks as secured quantum memory", Europhys. Letts. vol. 110, 10005 (2015).

Childs et al., "Universal computation by multiparticle quantum walk". Science 339, 791 (2013).

Crespi et al. "Anderson localization of entangled photons in an integrated quantum walk". Nature Photonics 7, 322 (2013).

Gellermann et al., "Localization of light waves in Fibonacci dielectric multilayers." Phys. Rev. Lett. 72, 633-636 (1994).

Harris et al., "Quantum Random Walks in a Programmable Nanophotonic Processor". CLEO FW4A.5 (Optical Society of America, 2015).

International Search Report and Written Opinion of the International Searching Authority; PCT/US2019/041403; dated June 29, 2020; 11 Pages; Korean Intellectual Property Office.

Kohmoto et al., "Localization of optics: Quasiperiodic media", Phys. Rev. Lett. vol. 58, 2436 (1987).

Leonetti et al., "Secure information transport by transverse localization of light." Sci. Rep. 6, 29918; (2016).

Levine et al., "Quasicrystals: A new class of ordered structures". Phys. Rev. Lett. 53, 2477 (1984).

Lovett et al., "Universal quantum computation using the discrete-time quantum walk," Phys. Rev. A81, 042330 (2010).

Lucic et al., "Light propagation in quasi-periodic Fibonacci waveguide arrays," J. Opt. Soc. Am. B 32(7), 1510-1513 (2015).

Macia, Enrique, "Exploiting quasiperiodic order in the design of optical devices", Phys. Rev. B 63 205421 (2001).

Macia, Enrique, "Optical engineering with Fibonacci dielectric multilayers", Appl. Phys. Lett. vol. 73, 3330 (1998).

Martin et al., "Anderson localization in optical waveguide arrays with off-diagonal coupling disorder." Opt. Express vol. 19, 13636 (2011).

Mosley et al., "Reconstructing Core-to-Core Variations of Propagation Constant in Coupled Multicore Fiber for Quantum Walks," in CLEO: 2015, OSA Technical Digest (online) (Optical Society of America, 2015), paper SM2L.4.

Nguyen et al., "Multiple spectral window mirrors based on Fibonacci chains of dielectric layers" Opt. Comm. vol. 283, 4199 (2010).

Nielsen et al., "Quantum computation and quantum information", Cambridge University Press 2010.

Owens et al., "Two-photon quantum walks in an elliptical direct-write waveguide array," New J. of Physics 13, 075003 (2011).

Perets et al., "Realization of quantum walks with negligible decoherence in waveguide lattices," Phys. Rev. Lett. 100, 170506 (2008).

Peruzzo et al. "Quantum walks of correlated photons". Science 329, 1500-1503 (2010).

Sansoni,et al. "Two-Particle Bosonic-Fermionic Quantum Walk via Integrated Photonics". Phys. Rev. Lett. 108, 010502 (2012).

Spring et al., "Boson sampling on a photonic chip," Science 339, 798-801 (2012).

Tang et al., "Experimental two-dimensional quantum walks on a photonic chip," Sci. Adv. 4: eaat3174 (2018).

Wikipedia, "Fibonacci number", available online at <https://en.wikipedia.org/w/index.php?title=Fibonacci_number&oldid=980404449>, Sep. 26, 2020, 24 pages.

\* cited by examiner

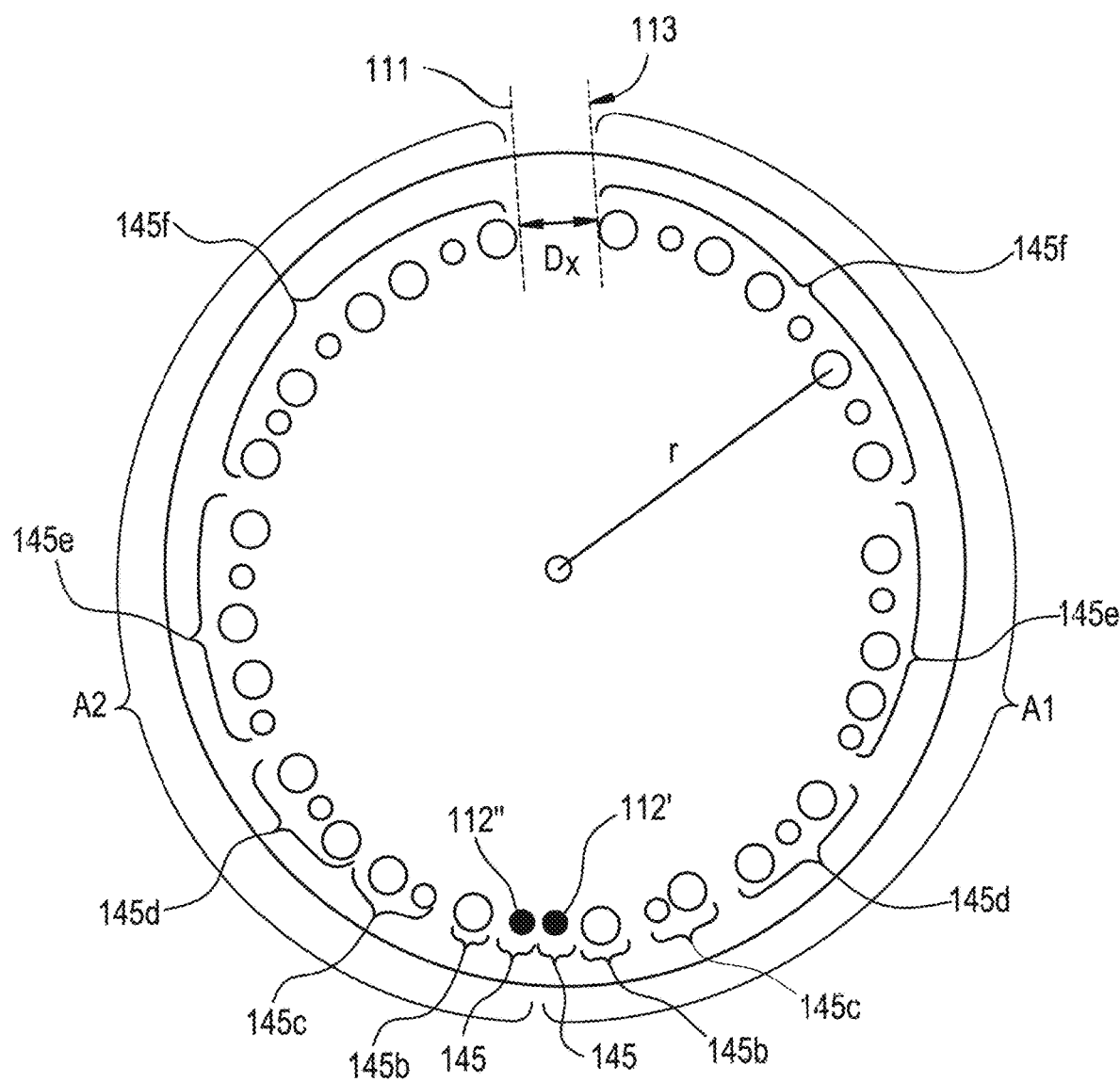

$S_j = S_{j-2} S_{j-2}, S_1 = A, S_2 = B$
$S_3 = S_1 S_2 = AB,$
$S_4 = S_2 S_3 = BAB$
$S_5 = S_3 S_4 = ABBAB$
$S_6 = S_4 S_5 = BABABBAB$ $F_6 = S_1 - S_2 \; A \; S_6$

MULTICORE RING FIBERS FOR QUANTUM SYSTEMS, AND SUCH SYSTEMS

CROSS-REFERENCE TO RELATED APPLICATIONS

This application claims the benefit of priority under 35 U.S.C. § 119 of U.S. Provisional Application Ser. No. 62/912,414 filed on Oct. 8, 2019, and U.S. Provisional Application Ser. No. 62/912,426 filed on Oct. 8, 2019, the content of which is relied upon and incorporated herein by reference in its entirety.

BACKGROUND

The present disclosure relates to multicore optical fibers suitable for use in quantum systems and to systems comprising such multicore optical fibers. More specifically, the present disclosure relates systems comprising multicore ring fibers, for example multicore ring fibers with cores arranged in a quasi-periodic sequence for realizing localized quantum walks.

SUMMARY

According to the subject matter of the present disclosure, a multicore optical fiber includes a plurality of fiber cores disposed in a fiber cladding. The plurality of cores include one or more first waveguiding core and one or more second waveguiding core. The one or more first waveguiding cores have a first propagation constant, the one or more second waveguiding cores have a second propagation constant, and the first propagation constant is different than the second propagation constant. The one or more first waveguiding cores and the one or more second waveguiding cores are disposed in the cladding in a ring distribution and at least a portion of the ring distribution is arranged based on a quasi-periodic sequence having a plurality of sequence segments. Further, each sequence segment is determined based on a quasi-periodic function, each sequence segment has an order, each sequence segment corresponds to an arrangement segment of one or more first waveguiding core, one or more second waveguiding core, or a combination thereof. Moreover, the ring distribution of the first and second waveguiding cores disposed in the cladding includes at least one arrangement segment corresponding with a third-order sequence segment or higher of the quasi-periodic sequence.

In accordance with one embodiment of the present disclosure a method of determining a photon probability distribution includes directing a plurality of photons generated using a photon generator into an input end of an individual waveguiding core of a multicore optical fiber. The multicore optical fiber includes a plurality of waveguiding cores disposed in a cladding. The plurality of cores include one or more first waveguiding cores and one or more second waveguiding cores. The one or more first waveguiding cores have a first propagation constant, the one or more second waveguiding cores have a second propagation constant, and the first propagation constant is different than the second propagation constant. The one or more first waveguiding cores and the one or more second waveguiding cores are disposed in the cladding in a ring distribution and at least a portion of the ring distribution is arranged based on a quasi-periodic sequence having a plurality of sequence segments. Further, each sequence segment is determined based on a quasi-periodic function, each sequence segment has an order, each sequence segment corresponds to an arrangement segment of one or more first waveguiding cores, one or more second waveguiding cores, or a combination thereof. Moreover, the ring distribution of the first and second waveguiding cores disposed in the cladding includes at least one arrangement segment corresponding with a third-order sequence segment or higher of the quasi-periodic sequence. The method further includes receiving the plurality of photons using a plurality of photon detectors, where each of the plurality of photon detectors is optically coupled to an output end of at least one of the plurality of cores and determining a photon probability distribution based on the plurality of photons received by the plurality of photon detectors.

Although the concepts of the present disclosure are described herein with primary reference to quantum walks, it is contemplated that the concepts will enjoy applicability to any quantum systems, for example: quantum information system, quantum communication system, quantum computing system, and quantum simulations.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

The following detailed description of specific embodiments of the present disclosure can be best understood when read in conjunction with the following drawings, where like structure is indicated with like reference numerals and in which:

FIG. 2C schematically depicts a cross-section of another example multicore optical fiber, according to one or more embodiments shown and described herein;

FIG. 4C graphically depicts measured photon probability distribution determined using a communications system comprising the fiber of FIG. 4B, according to one or more embodiments shown and described herein;

DETAILED DESCRIPTION

Figure 1:
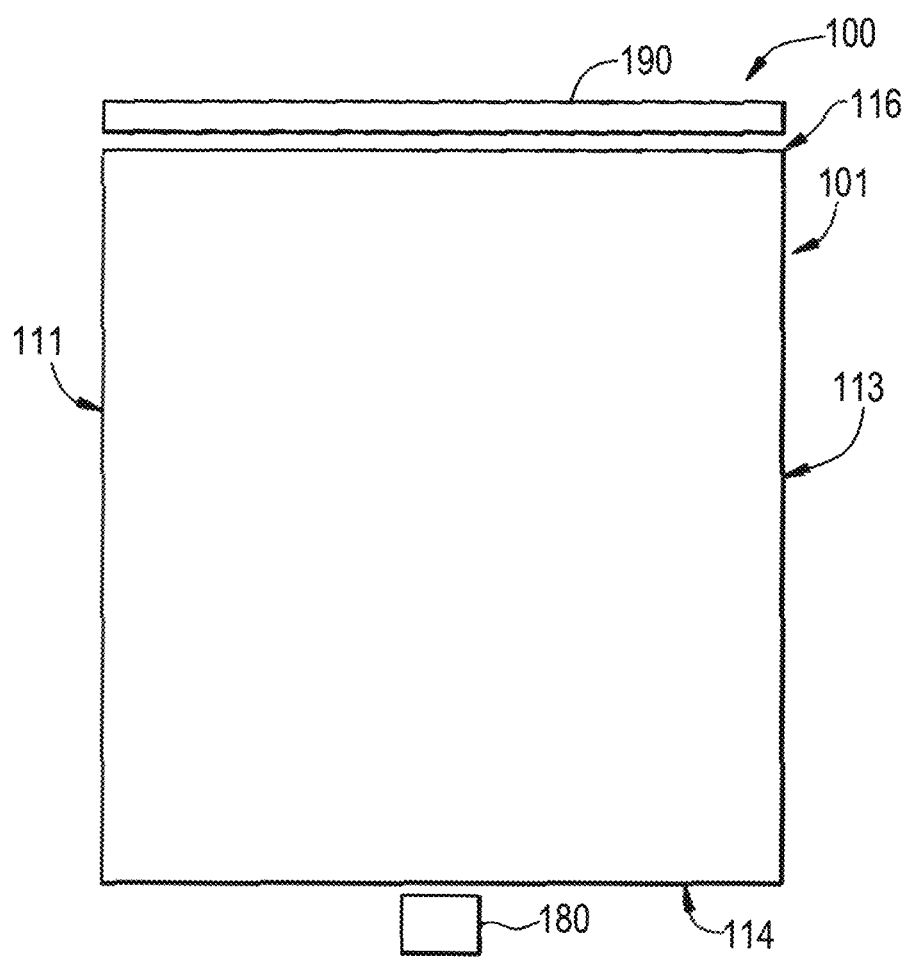
FIG. 1 schematically depicts a communications system including a photon generator, a multicore optical fiber, and a photon detector, according to one or more embodiments shown and described herein.

Quantum walks have a variety of potential applications in quantum communications and quantum computing, for example, in the development of quantum algorithms and quantum simulations. Quantum walks may increase computing speed and facilitate problem solving that is not feasible using a classical computer. In addition, photons are useful for performing a quantum walk due to the dual wave-particle nature of photons. One phenomenon that occurs in a quantum walk is localization, which is the absence of diffusion of waves in a disordered medium. Localized quantum walks may result in symmetrical probability distributions and thus localized quantum walks show potential for applications in quantum communication, for example, using localized photonic states for the secure transmission of information and using localized photonic states as a quantum memory. Localized quantum walks may be realized using randomly disordered systems of waveguides (e.g., spatially or temporally disordered), but this requires a large number of random disorder systems and the randomness of each system needs to be controlled within a defined range of the disorder. Further, localized quantum walks that result in symmetrical probability distributions are impossible in spatially random disorder systems and while localized quantum walks with symmetrical probability distribution are possible with temporally random disorder systems by using multiple quantum coins, the multiple quantum coin approach is difficult to implement practically. Thus, improved methods and systems for realizing localized quantum walks are desired.

Reference will now be made in detail to embodiments of a communications system for realizing improved localized quantum walks. The communications system includes a multicore optical fiber comprising a cladding and a plurality of cores (also referred to herein as the waveguiding cores) comprising one or more first waveguiding cores and one or more second waveguiding cores disposed in the cladding. The one or more first waveguiding cores and one or more second waveguiding cores comprise differing propagation constants and are arranged in a quasi-periodic sequence. (The propagation constant of a mode in a waveguiding fiber core determines how the amplitude and phase of that light with a given frequency varies along the propagation direction z (i.e., along the core axis). A single mode fiber core has only one mode propagating through the core. The propagation constant depends on the wavelength of the light propagating through the waveguiding core.) As used herein, a "quasi-periodic sequence" refers to a sequence arranged with a designed pattern that lacks translational symmetry. In addition, a structure (such as the multicore optical fiber) that is made using a quasi-periodic sequence is made using building blocks (e.g., arrangement segments of waveguiding cores) that are arranged using a designed pattern that lacks translational symmetry. The quasi-periodic sequence of first and second waveguiding cores forms a deterministic disorder system and thus quantum walks performed by directing one or more photons into one or more waveguiding cores of the multicore optical fiber are localized and result in a symmetrical probability distribution that is predictable, controllable, and repeatable. While not intending to be limited by theory, localized quantum walks performed in a disordered system, such as the communication system described herein, can be used to store information regarding an initial state of qubits and thus may be used as part of a secured quantum memory. Further, storage time of a quantum memory will be directly related to the number of implementable steps of the quantum walk. Without localization, the size of the position space required to store the information increases linearly with time, making it challenging to store information for long durations.

In addition, the communications system 100 comprises one or more photon generators 180 optically coupled to an input end 114 of at least one of the plurality of cores 110 and one or more photon detectors 190 optically coupled to an output end 116 of at least one of the plurality of cores 110. For example, in some embodiments, at least one photon detector of the one or more photon detectors 190 is optically coupled to the output end 116 of the plurality of cores 110.

In operation, the communications system 100 may be used to perform a quantum walk, which may be used to determine a photon probability distribution. For example, performing the quantum walk may comprise directing a plurality of photons generated using the photon generator 180 into the input end 114 of one or more individual waveguiding core of the multicore optical fiber 101, receiving the plurality of photons using one or more photon detectors 190, and determining a photon probability distribution based on the plurality of photons received by the one or more photon detectors 190. As used herein, a "photon probability distribution," is a distribution function that represents the probabilities of a photon that is directed into the input end 114 of the multicore optical fiber 101 exiting the output end 116 of each individual waveguiding core of the plurality of cores 110 of the multicore optical fiber 101.

Referring now to FIGS. 2, 2A-2C, 3A, 3B and 4A, 4B, adjacent waveguiding cores of the plurality of cores 110 disposed in the ring distribution 140 are spaced apart from one another by a spacing distance D (core center to core center distance D). While not intending to be limited by theory, during a quantum walk, each photon "walks" through the multicore optical fiber 101, moving between adjacent cores via evanescent coupling while propagating from the input end 114 of the multicore optical fiber 101 to the output end 116 of the multicore optical fiber 101. Thus, the spacing distance D between adjacent cores is close enough for evanescent coupling to occur, for example, the spacing distance D may comprise about 40 µm or less, for example, about 30 microns or less, about 25 µm or less, about 20 µm or less, about 15 µm or less, about 10 µm or less, about 7.5 µm or less, or the like. For example, D may comprise about 30 µm or less, for example, about 25 µm or less, about 20 µm or less, about 15 µm or less, about 10 µm or less, about 5 µm or less, or the like.

Further, in some embodiments, adjacent cores of the plurality of cores 110 may be uniformly spaced in the ring distribution 140. The spacing distance D' between the edges of the adjacent cores is also close enough for evanescent coupling to occur, for example, the spacing distance D' may be greater than about 2 µm about 30 µm or less, for example, about 25 µm or less, about 20 µm or less, about 15 µm or less, about 10 µm or less, about 7.5 µm or less, or the like. In some embodiments the distance D' is 3 µm to 30 µm, and in some embodiments 5 µm to 30 µm.

Referring to FIGS. 2, 2A-2C, 4A and 4B, the plurality of cores may include one or more first waveguiding cores 120 that comprise a first propagation constant and the one or more second waveguiding cores 130 that comprise a second propagation constant. Without intending to be limited by theory, the propagation constant of a waveguiding core determines how the amplitude and phase of light propagating in the cores with a given frequency varies along a propagation direction. In these embodiments the first propagation constant is different than the second propagation constant. The propagation constant depends on a number of factors, such as the refractive index of the cores and the diameter of the cores. The propagation constant may be determined by the V-number V, where $$V = (2\pi a)\left(\frac{NA}{\lambda}\right), NA = (n_{WG} - n_{CLAD})^{\frac{1}{2}},$$

$n_{WG}$ is the refractive index of an individual cores of the plurality of cores 110, $n_{CLAD}$ is the refractive index of the cladding 105, $a_1$ is a radius of an individual cores of the plurality of cores 110, and λ is the wavelength of one or more photons propagating along the plurality of cores 110. The wavelength λ, may be situated for example, in the following wavelength ranges: 800 nm to 900 nm, 920 nm to 970 nm, or 1200 nm to 1400 nm, 1530 nm to 1565 nm, or 1.0 µm to 1.1 µm.

Further, the one or more first waveguiding cores 120 comprise a first V-number $V_1$, the one or more second waveguiding cores 130 comprise a second V-number $V_2$, and the first V-number $V_1$ is different than the second V-number $V_2$. In particular, the first V-number $$V_1 = (2\pi a_1)\left(\frac{NA_1}{\lambda}\right), \text{ where } NA_1 = (n_{WG1} - n_{CLAD})^{\frac{1}{2}},$$

$n_{WG1}$ is the refractive index of the one or more first waveguiding cores 120, $n_{CLAD}$ is the refractive index of the cladding 105, $a_1$ is a radius of the one or more first waveguiding cores 120, and λ is the wavelength of one or more photons propagating along the plurality of cores 110 and the second V-number $$V_2 = (2\pi a_2)\left(\frac{NA_2}{\lambda}\right), \text{ where } NA_1 = (n_{WG1} - n_{CLAD})^{\frac{1}{2}},$$

$n_{WG2}$ is the refractive index of the one or more second waveguiding cores 130, $n_{CLAD}$ is the refractive index of the cladding 105, $a_2$ is a radius of the one or more second waveguiding cores 130, and λ is the wavelength of one or more photons propagating along the plurality of cores 110. Moreover, as the one or more first waveguiding cores 120 and the one or more second waveguiding cores 130 are single mode cores, the first V-number $V_1$ and the second V-number $V_2$ are less than 2.405.

As shown mathematically by the V-number, two waveguiding cores that comprise different refractive indices may comprise different propagation constants and two waveguiding core that comprise different diameters may comprise different propagation constants. For example, the one or more first waveguiding cores 120 comprise a first diameter and a first refractive index and the one or more second waveguiding cores 130 comprise a second diameter and a second refractive index. To achieve differing propagation constants, the first diameter may be different than the second diameter, the first refractive index may be different than the second refractive index, or both.

Moreover, while not intending to be limited by theory, fields of the waves (e.g., light waves) propagating in the multicore optical fiber 101 of first and second waveguiding cores 120, 130 may be coupled and the multicore optical fiber 101 may comprise a first coupling coefficient $\kappa_{12}$ (i.e. the coupling coefficient for coupling from a second waveguiding core 130 to a first waveguiding core 120) and a second coupling coefficient $\kappa_{21}$ (i.e., the coupling coefficient for coupling from a first waveguiding core 120 to a second waveguiding core 130), which represent the amount of couplings between the fields in the two cores. In other words, coupling coefficients measure the amount of overlap between the modal fields $\psi_1(x, y)$ and $\psi_2(x, y)$ in a first waveguiding core 120 and a second waveguiding core 130, respectively. Thus, each coupling coefficient κ is governed by an overlap integral, which indicates the behavior of the coupling between the modal fields resulting in a transfer of energy from one waveguiding core to the other. Further, the first coupling coefficient $\kappa_{12}$ is different than the second coupling coefficient $\kappa_{21}$. In general, the modal fields in waveguiding cores $\psi_1(x, y)$ and $\psi_2(x, y)$ depend on various parameters such as the widths (e.g., diameters) of the cores, the refractive indices of the core s $n_1(x, y)$, $n_2(x, y)$, the material of the cladding 105, and the wavelength of operation (k). While not intending to be limited by theory, the coupling coefficients $\kappa_{12}$ and $\kappa_{21}$ may be mathematically represented by $$\kappa_{12} = \frac{k_0^2}{2\beta_1} \frac{\iint_{-\infty}^{\infty} \psi_1^* \Delta n_1^2 \psi_2 dxdy}{\iint_{-\infty}^{\infty} \psi_1^* \psi_1 dxdy} \text{ and } \kappa_{21} = \frac{k_0^2}{2\beta_2} \frac{\iint_{-\infty}^{\infty} \psi_2^* \Delta n_2^2 \psi_1 dxdy}{\iint_{-\infty}^{\infty} \psi_2^* \psi_2 dxdy}$$

where $b_1$ is the propagation constant of the first waveguiding core 120, $b_2$ is the propagation constant of the second waveguiding core 130, $$k_0 = \frac{2\pi}{\lambda},$$

$\Delta n_1^2 = n_T^2 - n_2^2$, and $\Delta n_2^2 = n_T^2 - n_1^2$, and where $n_T(x, y)$ is the index profile of a two waveguiding core portion of the multicore optical fiber 101 that comprises an individual first waveguiding core 120 adjacent an individual second waveguiding core 130.

Referring still to FIGS. 2, 2A-2C and 4A, 4B, in some embodiments at least a portion of the ring distribution 140 is arranged based on a quasi-periodic sequence of the one or more first waveguiding cores 120 and the one or more second waveguiding cores 130. In other words, the ring distribution 140 is arranged such that the first and second propagation constants vary quasi-periodically and as such, the ring distribution 140 is disordered, varying coupling coefficients quasi-periodically also causes disorder.

The quasi-periodic sequence comprises a plurality of sequence segments. Each sequence segment is determined based on a quasi-periodic function and comprises an order (e.g., an order of the quasi-periodic sequence, such as a first order, second order, third order, or the like). Further, each sequence segment corresponds to an arrangement segment 145 of one or more first waveguiding cores 120, one or more second waveguiding cores 130, or a combination thereof. Each arrangement segment 145 may comprise a single waveguiding core or may comprise multiple waveguiding cores. For example, in the embodiments depicted in FIGS. 2, 2A-2C and 4A, 4B, the ring distribution 140 comprises arrangement segments 145 that correspond with six orders of sequence segments, i.e., a first-order arrangement segment 145a, a second-order arrangement segment 145b, a third-order arrangement segment 145c, a fourth-order arrangement segment 145d, a fifth-order arrangement segment 145e, and a sixth-order arrangement segment 145f. However, it should be understood that other ring distributions 140 are contemplated. For example, the ring distribution 140 may comprise a portion that follows a quasi-periodic sequence and another portion that does not. In addition, the portion of the ring distribution 140 that follows a quasi-periodic sequence may comprise any one or more sequence segments of a quasi-periodic sequence, not just the initial sequence segments of the quasi-periodic sequence. Example quasi-periodic sequences include the Fibonacci sequence, the Thue-Morse sequence, and the Rudin-Shapiro sequence. It should be noted that the example ring distributions 140 depicted in FIGS. 2A-2B follow the Fibonacci sequence, but other ring distributions are contemplated.

When the quasi-periodic sequence is a Fibonacci sequence, the quasi-periodic function of the Fibonacci sequence comprises $S_{N+1} = S_{N-1} S_N$, where $S_N$ comprises an N-order sequence segment and corresponds to an N-order arrangement segment. $S_1 = A$, where A comprises a first-order sequence segment and corresponds to a first-order arrangement segment 145a comprising an individual first waveguiding core 120 and $S_2 = B$, where B comprises a second-order sequence segment and corresponds to a second-order arrangement segment 145b comprising an individual second waveguiding core 130. $S_3 = S_1 S_2 = AB$, where AB comprises a third-order sequence segment and corresponds to a third-order arrangement segment 145c comprising the first-order arrangement segment 145a adjacent the second-order arrangement segment 145b. In particular, the third-order arrangement segment 145c comprises an individual first waveguiding core 120 disposed directly adjacent an individual second waveguiding core 130. $S_4 = S_2 S_3 = BAB$, where BAB comprises the fourth-order sequence segment and corresponds to a fourth-order arrangement segment 145d comprising the second-order arrangement segment 145b adjacent the third-order arrangement segment 145c. In particular, the fourth-order arrangement segment 145d segment comprises an individual first waveguiding core 120 disposed directly between two individual second waveguiding cores 130. $S_5 = S_3 S_4 = ABBAB$, where ABBAB comprises the fifth-order sequence segment and corresponds to a fifth-order arrangement segment 145e comprising the third-order arrangement segment 145c adjacent the fourth-order arrangement segment 145d. Furthermore, $S_6 = S_4 S_5 = BAB$, where BABABBAB comprises the sixth-order sequence segment and corresponds to a sixth-order arrangement segment 145f comprising the fourth-order arrangement segment 145d adjacent the fifth-order arrangement segment 145e.

The Thue-Morse sequence is a binary sequence (an infinite sequence of 0s and 1s) obtained by starting with 0 and successively appending the Boolean complement of the sequence obtained thus far. The first few steps of this sequence yield the strings 0 then 01, 0110, 01101001, 0110100110010110, and so on. The Boolean complement is the opposite digit(s) in a binary system, for example the Boolean complement of 1 is 0, the Boolean complement of 0 is 1, and the Boolean complement of 101 is 010. When the quasi-periodic sequence is a Thue-Morse sequence, the quasi-periodic function of the Thue-Morse sequence comprises $T_{N+1} = T_N \overline{T_N}$, where $T_N$ comprises a N-order sequence segment and corresponds to an N-order arrangement segment 145 and $\overline{T_N}$ comprises a sequence segment of the Boolean complement of the $T_N$ sequence segment and corresponds to the Boolean complement of the N-order arrangement segment 145.

In the Thue-Morse sequence, $T_1 = A$, where A comprises a first-order sequence segment and corresponds to a first-order arrangement segment 145a comprising an individual first waveguiding core 120. $T_2 = B$, where B comprises a second-order sequence segment and corresponds to a second-order arrangement segment 145b comprising an individual second waveguiding core 130. $T_3 = T_2 \overline{T_2} = BA$, where BA comprises a third-order sequence segment and corresponds to a third-order arrangement segment 145c comprising the second-order arrangement segment 145b adjacent the Boolean complement of the second-order arrangement segment 145b. In particular, the third-order arrangement segment 145c comprises an individual second waveguiding core 130 directly adjacent an individual first waveguiding core 120. $T_4 = T_3 \overline{T_3} = BAAB$, where BAAB comprises the fourth-order sequence segment and corresponds to a fourth-order arrangement segment 145d comprising the third-order arrangement segment 145c adjacent the Boolean complement of the third-order arrangement segment 145c. In particular, the fourth-order arrangement segment 145d comprises a pair of directly adjacent first waveguiding cores 120 positioned directly between pair of second waveguiding cores 130. $T_5=T_4T_4$=BAABABBA, where ABBAB comprises a fifth-order sequence segment and corresponds to a fifth-order arrangement segment 145e comprising the fourth-order arrangement segment 145d adjacent the Boolean complement of the fourth-order arrangement segment 145d. Further, $T_6=T_5T_5$=BAABABBAABBABAAB, where BAABABBAABBABAAB comprises a sixth-order sequence segment and corresponds to a sixth-order arrangement segment 145f comprising the fifth-order arrangement segment 145e adjacent the Boolean complement of the fifth-order arrangement segment 145e.

When the quasi-periodic sequence is a Rudin-Shapiro sequence, the quasi-periodic function of the Rudin-Shapiro sequence comprises a four-element substitution sequence with the following rules: P→PQ, Q→PR, R→SQ, and S→SR. Thus, a first-order sequence segment $S_1$=P, a second-order sequence segment $S_2$=PQ, a third-order sequence segment $S_3$=PQPR, a fourth-order sequence segment $S_4$=PQPRPQSQ, a fifth-order sequence segment $S_5$=PQPRPQSQPRSRPR, and so on. Further, to obtain a sequence of only two elements, A and B, the four-element sequence may be mapped onto a two element sequence where (P,Q)→A and (R,S)→B. Each instance of A corresponds to an individual first waveguiding core 120 of an arrangement segment 145 and each instance of B corresponds to an individual second waveguiding core 130 of an arrangement segment 145. Thus, $S_1$=A, where $S_1$ is a first-order sequence segment corresponding with a first-order arrangement segment 145a that comprises A, $S_2$=AA, where $S_2$ is a second-order sequence segment corresponding with a second-order arrangement segment 145b that comprises AA, $S_3$=AAAB, where $S_3$ is a third-order sequence segment corresponding with a third-order arrangement segment 145c that comprises AAAB, $S_4$=AAABAABA, where $S_4$ is a fourth-order sequence segment corresponding with a fourth-order arrangement segment 145d that comprises AAABAABA, and $S_5$=AAABAABAABBBAB, where $S_5$ is a fifth-order sequence segment corresponding with a fifth-order arrangement segment 145e that comprises AAABAABAABBBAB, and so on.

Figure 2:
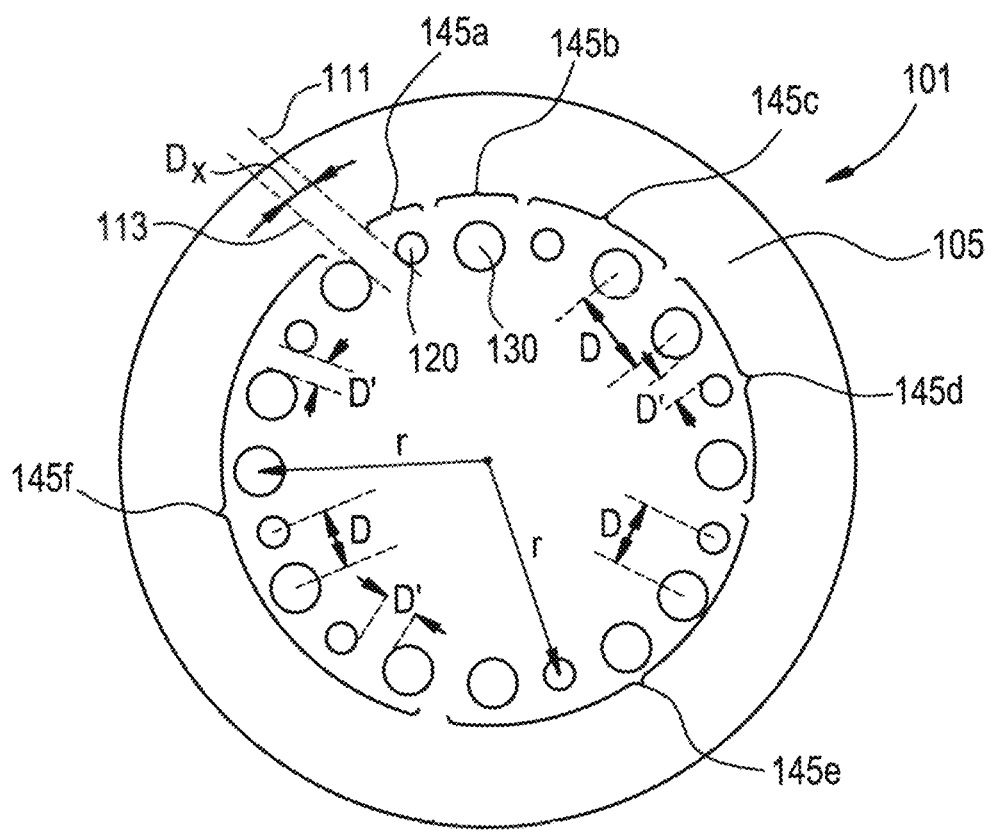
FIGS. 2 and 2A schematically depicts a cross-section of exemplary multicore optical fiber, according to one or more embodiments shown and described herein.
Figure 2A:
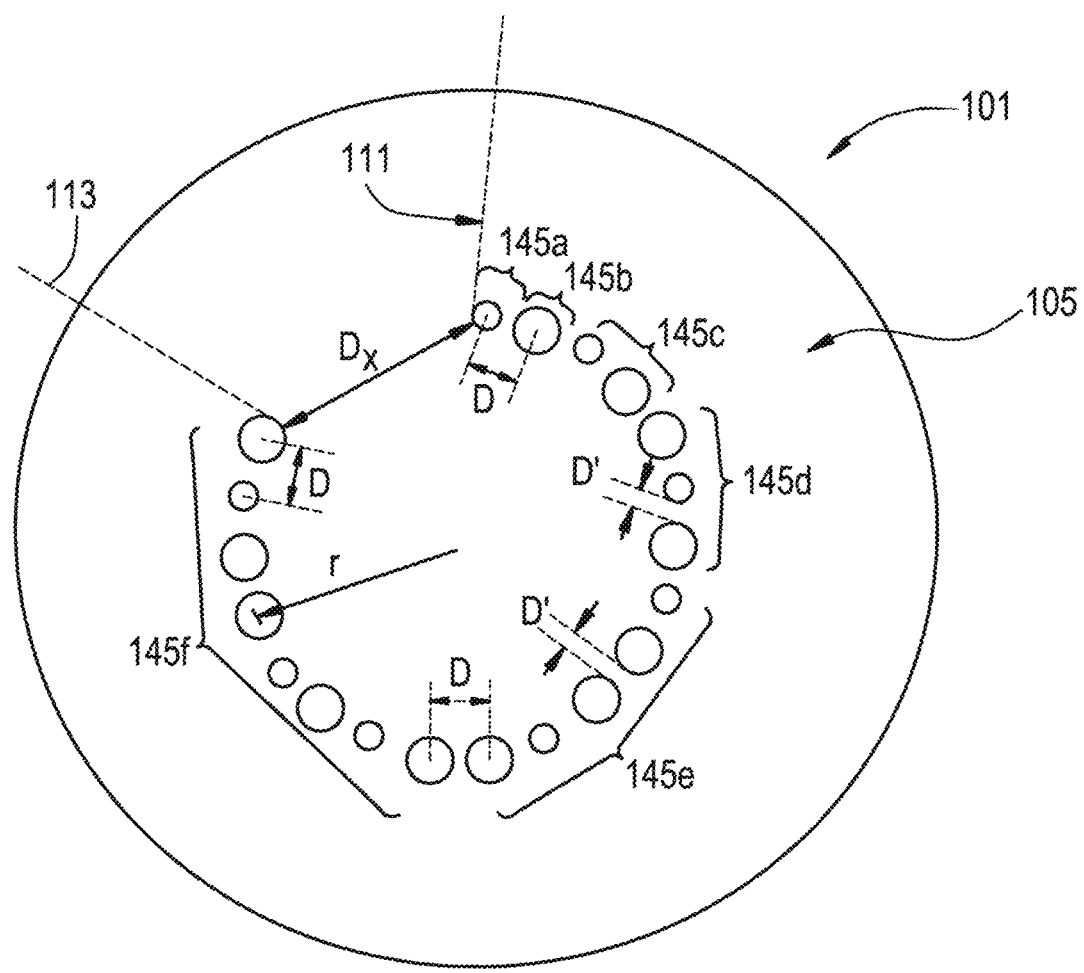

Referring now to FIG. 2, in some embodiments, the ring distribution 140 of the one or more first waveguiding cores 120 and the one or more second waveguiding cores 130 comprises a quasi-periodic sequence in which the lowest order arrangement segment 145 is positioned on a first side 111 of the multicore optical fiber 101 (e.g., the first-order arrangement segment 145a is positioned on the left side of the multicore optical fiber 101 in FIG. 2) and the highest order arrangement segment is positioned on a second side 113 of the multicore optical fiber 101, which is opposite the first side 111 (e.g., the sixth-order arrangement segment 145f is positioned on the right side of the multicore optical fiber 101 in FIG. 2). As depicted in FIG. 2A, the arrangement segments 145 of the ring distribution 140 may increase stepwise, in order, from the first side 111 to the second side 113 (e.g., from the first-order arrangement segment 145a on the left, stepwise to the sixth-order arrangement segment 145f on the right). Moreover, while FIG. 2 depicts that the entire ring distribution 140 comprises a quasi-periodic sequence extending in both the first direction 141 and the second direction 143, it should be understood that the entire ring distribution 140 or merely a portion of the ring distribution 140 may comprise a quasi-periodic sequence. The first side 111 and the second side 113 are not separated by a large distance $D_x$ and accordingly the waveguiding cores adjacent to the sides 111 and 113 couple to one another. That is, in this embodiment the distance $D_x$ is relatively small to enable evanescent coupling between the end cores, and a continuous quantum walk (QWs) within the core distribution 140. That is, multicore optical fiber configuration allows for an "endless" quantum walk—i.e., the photons walk around the ring without being stopped by a physical boundary. This creates an open quantum system, which is useful in a simulation system (for example when simulating materials with many nuclei). This embodiment can utilize a multicore optical fiber with fewer waveguiding cores, making it very efficient and less expensive to produce.

According to some embodiments a multicore optical fiber comprises:
 a cladding,
 a plurality of cores disposed in a cladding, wherein:
  the plurality of cores comprise one or more first waveguiding cores and one or more second waveguiding cores, wherein said cores are situated adjacent to at least one other core with a core center to core center spacing being not larger than 10 times the radius of the average core, such that the greater than 10% of the light will couple from one core to the adjacent core over a propagating distance of 1 cm, along the fiber length so as to provide coupling between the adjacent cores and to enable quantum walk between the cores; and
  the plurality of cores are disposed in the cladding in a ring distribution.

According to some embodiments the distance Dx is equal or smaller than the distance D'. According to some embodiments the distance Dx<30 μm.

According to some embodiments a multicore optical fiber comprises:
 a cladding,
 a plurality of cores disposed in a cladding, wherein:
  the plurality of cores comprise one or more first waveguiding cores and one or more second waveguiding cores, wherein said cores are situated adjacent to at least one other core with a core center to core center spacing being not larger than 10 times the radius of the average core, such that the greater than 10% of the light will couple from one core to the adjacent core over a propagating distance of 1 cm, along the fiber length so as to provide coupling between the adjacent cores and to enable continuous quantum walk;
  the one or more first waveguiding cores comprise a first propagation constant, the one or more second waveguiding cores comprise a second propagation constant, and the first propagation constant is different than the second propagation constant;
  the one or more first waveguiding cores and the one or more second waveguiding cores are disposed in the cladding in a ring distribution and at least a portion of the ring distribution is arranged based on a non-periodic sequence.

According to some embodiments a spacing distance between each adjacent pair of waveguiding cores in the plurality of waveguiding cores is about 30 μm or less. According to some embodiments the spacing distance D between each adjacent pair of waveguides in the plurality of waveguides is between 5 μm and 30 μm. According to some embodiments the spacing distance D between each adjacent pair of waveguides in the plurality of waveguides is between 7.5 μm and 30 μm. According to some embodiments the spacing distance D between each adjacent pair of waveguides in the plurality of waveguides is between 10 μm and 30 μm. According to some embodiments, the waveguiding cores are step-index cores. According to other embodiments the waveguiding cores are graded index cores. According to some embodiments the spacing distance D' between edges of each adjacent pair of waveguides in the plurality of waveguides is between 5 μm and 30 μm. According to some embodiments the spacing distance D' between edges of each adjacent pair of waveguides in the plurality of waveguides is between 7.5 μm and 30 μm. According to some embodiments the spacing distance D' between the edges of each adjacent pair of waveguides in the plurality of waveguides is between 10 μm and 30 μm. According to some embodiments, the waveguiding cores are step-index cores. According to other embodiments the waveguiding cores are graded index cores.

According to some embodiments a multicore optical fiber comprises:
a cladding,
a plurality of cores disposed in a cladding, wherein:
the plurality of cores comprise one or more first waveguiding cores and one or more second waveguiding cores, wherein said cores are situated adjacent to at least one other core with a core center to core center spacing being not larger than 10 times the radius of the average core, such that the greater than 10% of the light will couple from one core to the adjacent core over a propagating distance of 1 cm, along the fiber length so as to provide coupling between the adjacent cores and to enable quantum walk between the cores;
the one or more first waveguiding cores comprise a first propagation constant, the one or more second waveguiding cores comprise a second propagation constant;
the one or more first waveguiding cores and the one or more second waveguiding cores are disposed in the cladding in a ring distribution.

According to some embodiments the one or more first waveguiding cores and the one or more second waveguiding cores have the different diameters. According to some embodiments the one or more first waveguiding cores and the one or more second waveguiding cores have the different refractive index profiles. According to some embodiments the one or more first waveguiding cores and the one or more second waveguiding cores have the different refractive indices. According to some embodiments the first propagation constant is different than the second propagation constant.

However, according to some embodiments the one or more first waveguiding cores and the one or more second waveguiding cores have the same diameter and the same refractive index, and the first propagation constant and the second propagation constant are substantially the same. In these embodiments the core ring distribution is not quasi-periodic as shown in FIG. 2, but is instead periodic, as shown, for example in FIG. 3A.

Referring now to FIG. 2A, in some embodiments, the ring distribution 140 of the one or more first waveguiding cores 120 and the one or more second waveguiding cores 130 comprises a quasi-periodic sequence in which the lowest order arrangement segment 145 is positioned on a first side 111 of the multicore optical fiber 101 (e.g., the first-order arrangement segment 145a is positioned on the left side of the multicore optical fiber 101 in FIG. 2A) and the highest order arrangement segment is positioned on a second side 113 of the multicore optical fiber 101, which is opposite the first side 111 (e.g., the sixth-order arrangement segment 145f is positioned on the right side of the multicore optical fiber 101 in FIG. 2A). As depicted in FIG. 2A, the arrangement segments 145 of the ring distribution 140 may increase stepwise, in order, from the first side 111 to the second side 113 (e.g., from the first-order arrangement segment 145a on the left, stepwise to the sixth-order arrangement segment 145f on the right). Moreover, while FIG. 2A depicts that the entire ring distribution 140 comprises a quasi-periodic sequence extending in both the first direction 141 and the second direction 143, it should be understood that the entire ring distribution 140 or merely a portion of the ring distribution 140 may comprise a quasi-periodic sequence. The first side 111 and the second side 113 are separated by a sufficient distance $D_x$ such that the waveguiding cores adjacent to the sides 111 and 113 do not couple to one another. In such embodiments it is preferable that $D_x$ be greater than D'. According to some embodiments the distance Dx>30 μm. A system comprising such a fiber is a closed quantum system with boundary effects, and can simulate, for example when simulating materials with multiple nuclei.

Figure 2B:
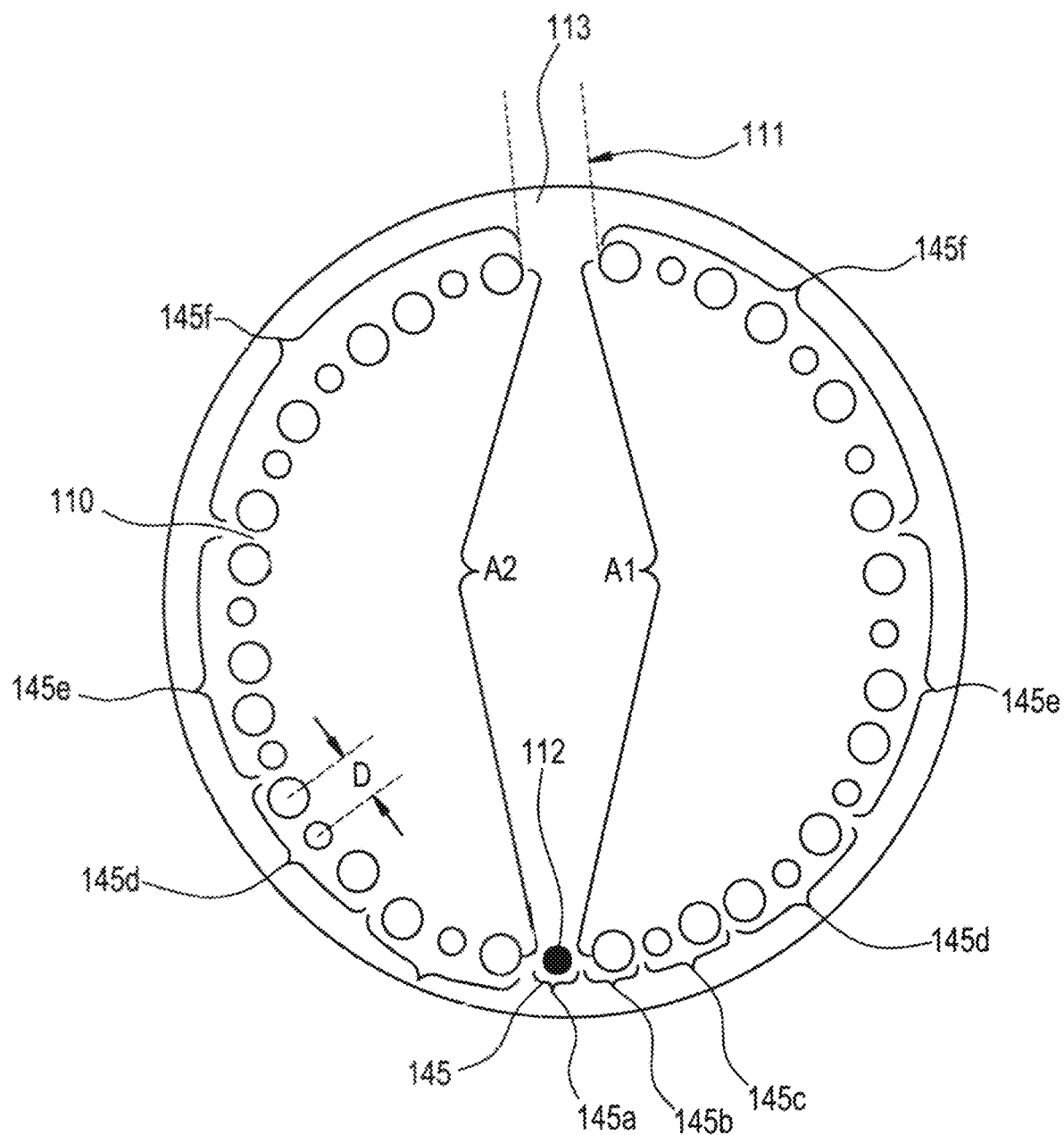
FIG. 2B schematically depicts a cross-section of another example multicore optical fiber, according to one or more embodiments shown and described herein.

Referring now to FIG. 2B, in some embodiments, the plurality of cores 110 comprise a central waveguiding core 112 that separates a first section 142 of the ring distribution 140 from a second section 144 of the ring distribution 140. The first section 142 of the ring distribution 140 extends in a first direction 141 from the central waveguiding core 112 and comprises a quasi-periodic sequence of first waveguiding cores 120 and second waveguiding cores 130. The second section 144 of the ring distribution 140 extends in a second direction 143 from the central waveguiding core 112 and comprises a quasi-periodic sequence of first waveguiding cores 120 and second waveguiding cores 130. In some embodiments, the central waveguiding core 112 comprises the first-order arrangement segment 145a for each of the quasi-periodic sequences that extend in both the first direction 141 and the second direction 143. The quasi-periodic sequences that extend in the first direction 141 and the second direction 143 may mirror one another. For example, in FIG. 2B, the quasi-periodic sequence extending both the first direction 141 and the second direction 143 comprises a Fibonacci sequence and include the first-order arrangement segment 145a (i.e., the shared central waveguiding core 112) through the sixth-order arrangement segment 145f. Moreover, while FIG. 2B depicts a plurality of cores 110 that include the central waveguiding core 112 and quasi-periodic sequences extending in both the first direction 141 and the second direction 143, it should be understood that the entire ring distribution 140 or merely a portion of the ring distribution 140 may comprise a quasi-periodic sequence.

Referring now to FIG. 2C, in some embodiments, the plurality of cores 110 comprise a first central waveguiding core 112' adjacent a second central waveguiding core 112". In the embodiment depicted in FIG. 2C, the ring distribution 140 extends in the first direction 141 from the first central waveguiding core 112' and comprises a quasi-periodic sequence of first waveguiding cores 120 and second waveguiding cores 130. In particular, the first central waveguiding core 112' comprises the first-order arrangement segment 145a of the quasi-periodic sequence that extends in the first direction 141. Furthermore, the ring distribution 140 extends in the second direction 143 from the second central waveguiding core 112" and comprises a quasi-periodic sequence of first waveguiding cores 120 and second waveguiding cores 130. In particular, the second central waveguiding core 112" comprises the first-order arrangement segment 145a of the quasi-periodic sequence that extends in the second direction 143. The quasi-periodic sequences that extend in the first direction 141 and the second direction 143 may mirror one another. For example, in FIG. 2C, the quasi-periodic sequence extending both the first direction 141 and the second direction 143 comprises a Fibonacci sequence and include the first-order arrangement segment 145a (i.e., the first central waveguiding core 112' for the sequence extending in the first direction 141 and the second central waveguiding core 112" for the sequence extending in the second direction 143) through the sixth-order arrangement segment 145f. Moreover, while FIG. 2C depicts a plurality of cores 110 that include the first and second central waveguiding cores 112', 112" and quasi-periodic sequences extending in both the first direction 141 and the second direction 143, it should be understood that the entire ring distribution 140 or merely a portion of the ring distribution 140 may comprise a quasi-periodic sequence.

Referring again to FIG. 2A-2C, it should be understood that the entire ring distribution 140 or merely a portion of the ring distribution 140 may comprise a quasi-periodic sequence. For example, the ring distribution 140 may comprise adjacent arrangement segments 145 corresponding with a first-order sequence segment through a second-order sequence segment, a first-order sequence segment through a third-order sequence segment, a first-order sequence segment through a fourth-order sequence segment, a first-order sequence segment through a fifth-order sequence segment, a first-order sequence segment through a sixth-order sequence segment, a first-order sequence segment through a seventh-order sequence segment, a first-order sequence segment through an eighth-order sequence segment, and so on. Thus, it should be understood that the ring distribution 140 may comprise any number of arrangement segments corresponding to any number of sequence segments. Further, in some embodiments, the ring distribution 140 comprises at least one arrangement segment 145 corresponding with a third-order sequence segment or higher, a fourth-order sequence segment or higher, fifth-order sequence segment or higher, sixth-order sequence segment or higher, seventh-order sequence segment or higher or the like. In some embodiments, the ring distribution 140 comprises arrangement segments 145 corresponding with a third-order sequence segment and a fourth-order sequence segment, a fourth-order sequence segment and a fifth-order sequence segments, a third-order sequence segment through a fourth-order sequence segment, or the like.

Multicore Optical Fiber

Figure 3A:
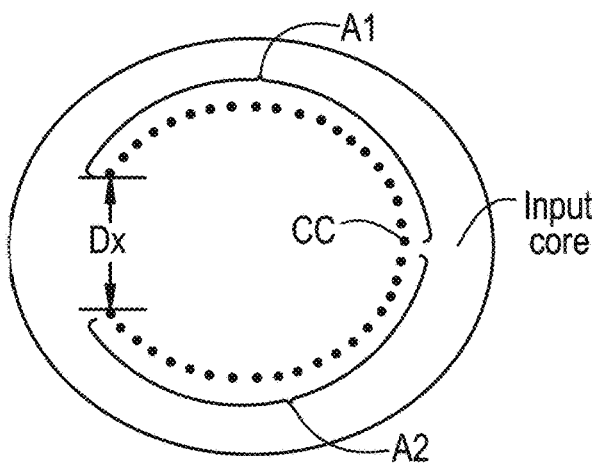
FIG. 3A schematically depicts a cross-section an example multicore optical fiber.
Figure 3B:
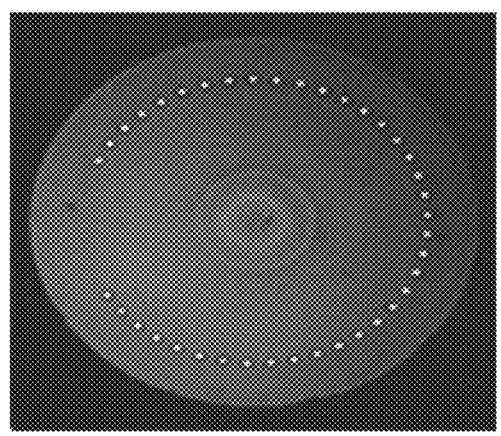
FIG. 3B depicts an image of a cross-section a manufactured multicore optical fiber corresponding to FIG. 3A.
Figure 3C:
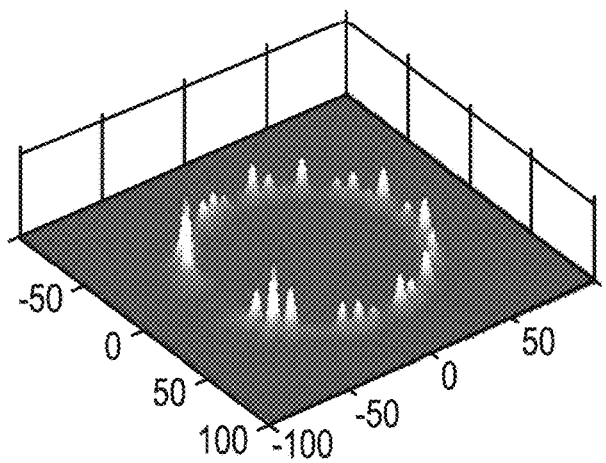
FIG. 3C graphically depicts measured photon probability distribution determined using a communications system comprising the fiber of FIG. 3B, according to one or more embodiments shown and described herein.

FIGS. 3A, 3B illustrates an example of a multicore ring optical fiber 101 that comprises 39 cores situated within the cladding. The multicore ring fiber shown in FIGS. 3A, 3B is designed and fabricated with identical single mode (SM) waveguiding cores that are regularly periodic and a situated in a circular ring. In this exemplary fiber all of the cores are single mode cores and all cores have same Δn (relative to cladding) and the same core diameter d. That is, in this example fiber the cores are designed to be identical. The main parameters of this multicore optical fiber are: core diameter d=4.4 µm, index difference Δn=ncore−nclad=0.0035, ring diameter r (i.e., distance r from each core center to the fiber center) is 120 µm, cladding diameter R is at least 155 µm m (e.g., 160 µm to 500 µm), the waveguiding cores are regularly (periodically) placed in a ring formation with the same spacing between the cores, and the input core in the central core CC. Measurement data shows that cores sizes are vary of about less than 10%, and average core diameter is 4.4 µm. FIG. 3B is a photograph of the manufactured fiber corresponding to FIG. 3A. FIG. 3C is a photograph of the manufactured of FIG. 3B, with the light at the operating wavelength λ=1550 nm propagating through the waveguiding cores. Other operating wavelengths may also be utilized. The operating wavelength λ, may be situated for example, in the following wavelength ranges: 800 nm to 900 nm, 920 nm to 970 nm, or 1200 nm to 1400 nm, 1530 nm to 1565 nm, or 1.0 µm to 1.1 µm.

In our experiments of single-photon quantum walks (QWs), we launched the signal into the center core (input core) of the core ring, and the QWs process takes place from the center waveguiding core (input waveguiding core) to the end cores of the two symmetrical arms A1, A2. In this embodiment, the two end-cores of the two arms A1, A2 are separated by a larger distance Dx than the rest of the cores in order to avoid coupling between these two end cores, so as not to provide continuous QWs on a continuous curved core distribution 140. In such embodiments it is preferable that $D_x$ is greater than D'. For example, in some embodiments $2D'<D_x<10D'$, or $2D'<D_x<30D'$.

The spacing distance D' between the edges of the adjacent waveguiding cores is also close enough for evanescent coupling to occur, for example, the spacing distance D' may be greater than about 2 µm about 30 µm or less, for example, about 25 µm or less, about 20 µm or less, about 15 µm or less, about 10 µm or less, about 7.5 µm or less, or the like. In some embodiments the distance D' is 3 µm to 30 µm, and in some embodiments 5 µm to 30 µm.

According to some embodiments a multicore optical fiber comprises:
 a cladding,
 a plurality of cores disposed in a cladding, wherein:
   the plurality of cores comprise one or more first waveguiding cores and one or more second waveguiding cores, wherein at least some of said cores are situated adjacent to at least one other core with a core center to core center spacing being not larger than 10 times the radius of the average core, such that the greater than 10% of the light will couple from one core to the adjacent core over a propagating distance of 1 cm, along the fiber length so as to provide coupling between the adjacent cores and to enable quantum walk between the cores; and
  the plurality of cores are situated periodically (or substantially periodically) within in the ring distribution.

According to some embodiments the distance Dx is greater than the distance D'. However, according to some embodiments the distance Dx is equal or smaller than the distance D'. According to some embodiments the distance Dx>30 µm.

Figure 3D:
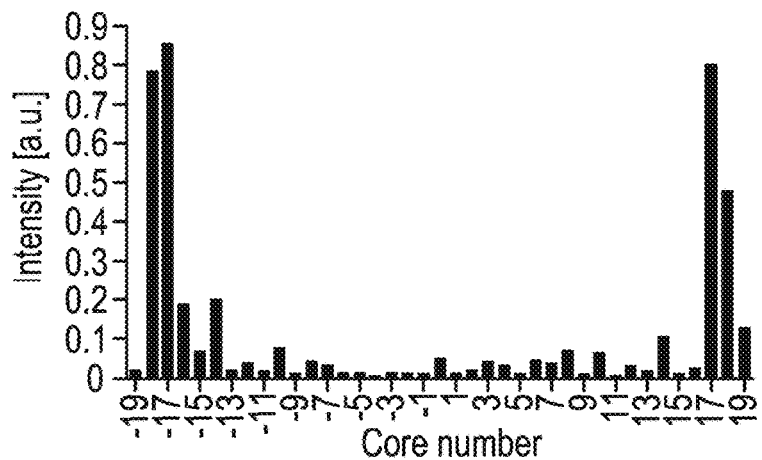
FIG. 3D graphically depicts modelled photon probability distribution determined using a communications system, according to one or more embodiments shown and described herein that utilizes multicore optical fiber of FIG. 3B.

Calculated probability photon distribution of quantum walks in this multicore optical fiber, and the of measured photon distribution (Experiment data) for this fiber are shown in FIGS. 3D and 3C respectively. Both FIG. 3C and FIG. 3D show a typical pattern of quantum walks, characterized by two strong lobes. That is, the experiment measurement of photon distribution at and simulation results are in good agreement. The feature of quantum walks with two strong lobes at the end of walking length are clearly shown in both FIGS. 3C and 3D.

In some embodiments of periodically arranged core distributions the distance Dx about the same as D'. In such embodiments the sides 111 and 113 are close enough to enable coupling between the two end cores, providing continuous quantum walk between the waveguiding cores. Thus, according to some embodiments a multicore optical fiber comprises:

a cladding,
a plurality of cores disposed in a cladding, wherein:
the plurality of cores comprise one or more first waveguiding cores and one or more second waveguiding cores, wherein at least some of said cores are situated adjacent to at least one other core with a core center to core center spacing being not larger than 10 times the radius of the average core, such that the greater than 10% of the light will couple from one core to the adjacent core over a propagating distance of 1 cm, along the fiber length so as to provide coupling between the adjacent cores and to enable quantum walk (e.g., continuous quantum) walk between the waveguiding cores;
the one or more first waveguiding cores comprise a first propagation constant, the one or more second waveguiding cores comprise a second propagation constant, and the first propagation constant is different than the second propagation constant;
the one or more first waveguiding cores and the one or more second waveguiding cores are disposed in the cladding in a ring distribution.

According to some embodiments the minimum distance between the edges of the adjacent core is at least equal to half the radius of the smaller core (and preferably at least the radius of the core). According to some embodiments the one or more first waveguiding cores and the one or more second waveguiding cores have the same diameter and the same refractive index.

According to some embodiments a multicore optical fiber comprises:
a cladding,
a plurality of cores disposed in a cladding, wherein:
the plurality of cores comprise one or more first waveguiding cores and one or more second waveguiding cores, wherein said cores are situated adjacent to at least one other core with a core center to core center spacing being not larger than 10 times the radius of the average core, such that the greater than 10% of the light will couple from one core to the adjacent core over a propagating distance of 1 cm, along the fiber length so as to provide coupling between the adjacent cores and to enable continuous quantum walk;
the one or more first waveguiding cores comprise a first propagation constant, the one or more second waveguiding cores comprise a second propagation constant, and the first propagation constant is different than the second propagation constant;
the one or more first waveguiding cores and the one or more second waveguiding cores are disposed in the cladding in a ring distribution and at least a portion of the ring distribution is arranged based on a non-periodic sequence.

In some embodiments the first propagation constant and the second propagation constant are the same. However, in some embodiments, the first propagation constant and the second propagation constant are different. According to some embodiments a spacing distance between each adjacent pair of waveguiding cores in the plurality of waveguiding cores is about 30 µm or less. According to some embodiments the spacing distance D between each adjacent pair of waveguides in the plurality of waveguides is between 5 µm and 30 µm. According to some embodiments the spacing distance D between each adjacent pair of waveguides in the plurality of waveguides is between 7.5 µm and 30 µm. According to some embodiments the spacing distance D between each adjacent pair of waveguides in the plurality of waveguides is between 10 µm and 30 µm. According to some embodiments, the waveguiding cores are step-index cores. According to other embodiments the waveguiding cores are graded index cores. According to some embodiments the spacing distance D' between edges of each adjacent pair of waveguides in the plurality of waveguides is between 5 µm and 30 µm. According to some embodiments the spacing distance D' between edges of each adjacent pair of waveguides in the plurality of waveguides is between 7.5 µm and 30 µm. According to some embodiments the spacing distance D' between the edges of each adjacent pair of waveguides in the plurality of waveguides is between 10 µm and 30 µm. According to some embodiments, the waveguiding cores are step-index cores. According to other embodiments the waveguiding cores are graded index cores.

According to some embodiments a multicore optical fiber comprises:
a cladding,
a plurality of cores disposed in a cladding, wherein:
the plurality of cores comprise one or more first waveguiding cores and one or more second waveguiding cores, wherein said cores are situated adjacent to at least one other core with a core center to core center spacing being not larger than 10 times the radius of the average core, so as to provide coupling between the adjacent cores to enable continuous quantum walk, such that the greater than 10% of the light will couple from one core to the adjacent core over a propagating distance of 1 cm, along the fiber length;
the one or more first waveguiding cores comprise a first propagation constant, the one or more second waveguiding cores comprise a second propagation constant;
the one or more first waveguiding cores and the one or more second waveguiding cores are disposed in the cladding in a ring distribution and at least a portion of the ring distribution is arranged based on a periodic sequence.

In some embodiments the first propagation constant and the second propagation constant are the same. However, in some embodiments, the first propagation constant and the second propagation constant are different.

According to some embodiments a spacing distance between each adjacent pair of waveguiding cores in the plurality of waveguiding cores is about 30 µm or less. According to some embodiments the spacing distance D between the centers of each adjacent pair of waveguides in the plurality of waveguides is between 10 µm and 30 µm. According to some embodiments the spacing distance D' between the edges of each adjacent pair of waveguiding cores in the plurality of waveguiding cores is between 7.5 µm and 30 µm, or between 10 µm and 30 µm. According to some embodiments, the waveguiding cores are step-index cores. According to other embodiments the waveguiding cores are graded index cores.

Exemplary Embodiment of the Multicore Fiber 101

Figure 4A:
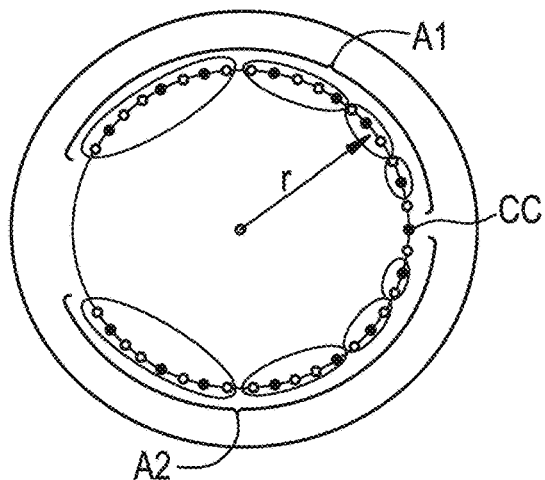
FIG. 4A schematically depicts a cross-section of another example multicore optical fiber, according to one or more embodiments shown and described herein.
Figure 4B:
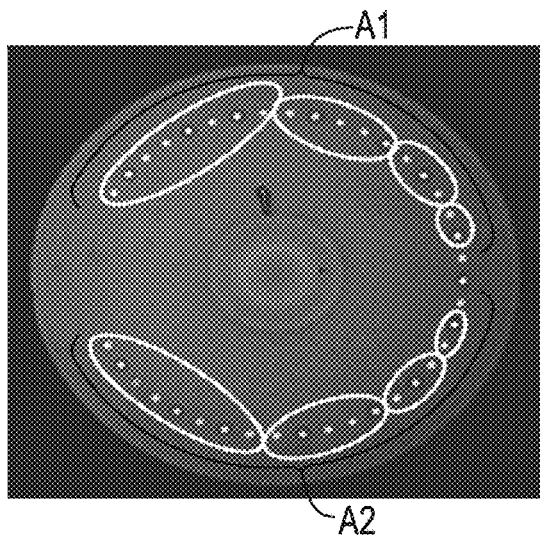
FIG. 4B depicts an image of a cross-section a manufactured multicore optical fiber corresponding to the fiber FIG. 4A.

FIG. 4A illustrates a of the multicore optical fiber 101 that comprises 39 waveguiding cores 110 situated within the cladding 105. The waveguiding cores 110 comprising one or more first waveguiding cores arranged in a ring (e.g., in a broken ring comprising a plurality of arms, for example Arm1, and Arm2) forming a ring distribution 140. More specifically, it is preferable, as shown in this embodiment, that the core centers are spaced from the fiber center by a distance r. In some embodiments core centers are spaced from the fiber center by a distance Dc=r±0.2 dc, for example, Dc=r±0.15 dc, where dc is the diameter of the waveguiding core. In other embodiments the edges of the cores nearest to the fiber center may be spaced from the fiber center by the distance r'. In other embodiments the edges of the cores nearest to the cladding's outer diameter center may be spaced from the fiber center by the distance r". In this exemplary embodiment, the ring distribution 140 includes of the one or more first waveguiding cores 120 and the one or more second waveguiding cores 130 arranged in a quasi-periodic sequence. FIG. 4B is a photograph of the manufactured fiber corresponding to FIG. 4A.

Figure 5:
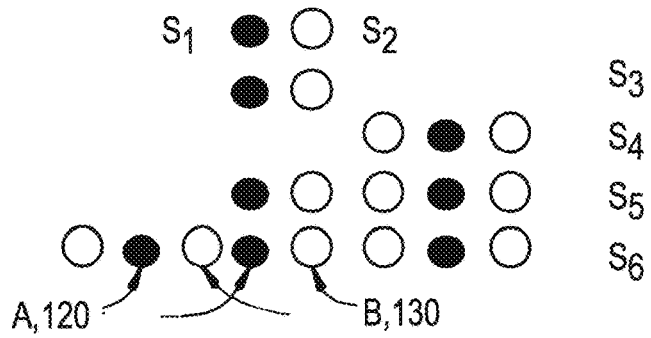
FIG. 5 illustrates the general rule for recursive construction of quasi-periodic array of waveguiding cores.

In this embodiment, the ring of cores is constructed with Fibonacci sequence of the two types of single mode (SM) cores, i.e., cores A (waveguiding cores 120) and cores B (waveguiding cores 130). Fiber cores A (i.e., the waveguiding cores 120) have the refractive index difference having $\Delta n1 = ncore1 - nclad$, where $\Delta n1$ is the refractive index of the waveguiding cores 120, and nclad is the refractive index of the cladding at the operating wavelength (e.g., $\lambda = 1550$ nm). Fiber cores B (i.e., the waveguiding cores 130) have the refractive index difference $\Delta n2 = ncore2 - nclad$, where $\Delta n2$ is the refractive index of the waveguiding cores 130 at the operating wavelength (e.g., $\lambda = 1550$ nm). In this embodiment all waveguiding cores 110 have same diameters d. However, in some embodiments the core diameters may not be the same. In general, the construction of core-ring arrangement 140 is the same as the sequence as that of the Fibonacci arrays of waveguiding cores, which is illustrated in FIG. 5). Parameters of this embodiment of the optical fiber 101 are as follows. For the second waveguiding cores 120 the refractive index difference (relative to the cladding) is $\Delta n1 = ncore1 - nclad = 0.0035$. In some exemplary embodiments $0.0025 \le \Delta n1 \le 0.01$. For the second waveguiding cores 120 the refractive index difference $\Delta n2 = ncore1 - nclad = 0.0045$. In some exemplary embodiments $0.0025 \le \Delta n2 \le 0.01$. In some exemplary embodiments $0.001 \le |\Delta n2 - \Delta n1| \le 0.01$. The ring diameter (i.e., the distance r from the core centers to the of the center of the fiber) is 120 μm, and the outer cladding diameter R is greater than 160 μm (e.g., 500 μm, 300 μm, 250 μm, or therebetween). Although the fiber core diameters were designed to be the same, the core diameters in a manufactured optical fiber 101 were slightly different. Fabricated fiber measurements show that cores diameters vary by 15% or less (as compared to the average core diameter), with the average core diameter being 4.55 mm. Thus, in this embodiment, the diameters of the waveguiding cores are substantially the same.

Figure 4C:
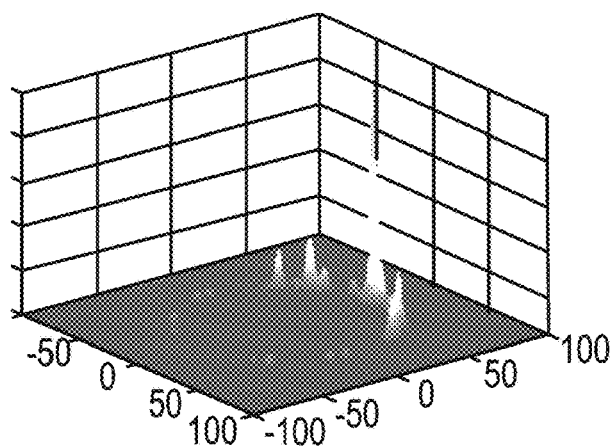
FIG. 4C graphically depicts measured photon probability distribution determined using a communications system comprising the fiber of FIG. 4A, according to one or more embodiments shown and described herein.
Figure 4D:
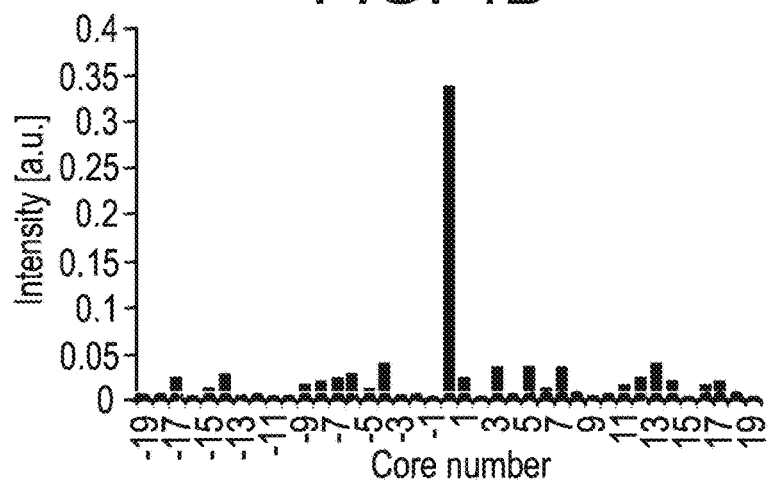
FIG. 4D graphically depicts modelled photon probability distribution determined using a communications system comprising the fiber of FIG. 3A, according to one or more embodiments shown and described herein.

Calculated probability photon distribution of quantum walks in this multicore optical fiber embodiment, and the of measured photon distribution (Experimental data) for this fiber embodiment are shown in FIGS. 4D and 4C, respectively. Both FIG. 4C and FIG. 4D show different behavior than that exhibited by the multicore ring fiber of FIGS. 3A, 3B. Instead of the typical pattern of quantum walks, characterized by two strong lobes as shown in FIGS. 3C and 3D, figures FIG. 4C and FIG. 4D display only one strong lobe. The atypical feature of quantum walks with only one strong lobe at the end of walking length produced due to quasi-periodic core distributions within the multicore fiber 101 are a clearly shown in both FIGS. 4C and 4D. That is, the experiment measurement of photon distribution at and simulation results are in good agreement.

FIG. 5 illustrates the general rule for recursive construction of quasi-periodic array of waveguiding cores with Fibonacci sequence based on two different waveguiding cores. The $j^{th}$-order Fibonacci element is defined as $S_j = S_{j-2} S_{j-1}$, $S_1 = A$, $S_2 = B$, where A and B are two different single-mode waveguiding cores. The waveguiding cores A and B placed closely to one another to ensure evanescent coupling between the two adjacent waveguiding cores. More specifically, FIG. 5 illustrates an exemplary recursive construction of quasi-periodic array (sequence(s)) of waveguiding cores with Fibonacci sequence in jth-order of two different waveguiding cores A and B, and elements $S_1$, $S_2$ ... $S_6$ of Fibonacci arrays of waveguiding cores 120, 130 composed by two types of waveguiding cores: single mode waveguiding cores A (smaller circles, corresponding to the waveguiding cores 120) and single mode waveguiding cores B (larger circles, corresponding to the waveguiding cores 130).

Figure 6:
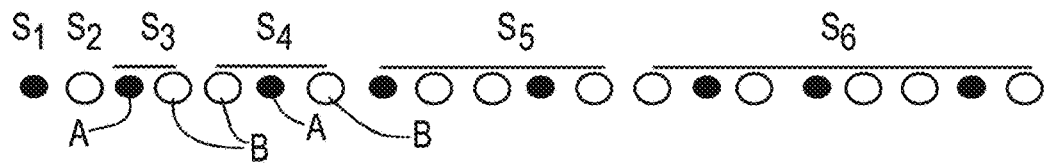
FIG. 6 illustrates a construction of an exemplary Fibonacci array sequence of waveguiding cores (FAWC)

FIG. 6 illustrates a construction of an exemplary Fibonacci array (sequence) of waveguiding cores (FAWC). In order to increase the complexity of the arrays of waveguiding cores, or to make the waveguiding core sequence less orderly, we define a new $j^{th}$-order Fibonacci array of waveguiding cores as $F_j = S_1 S_2 \ldots S_j$ where $S_1$, $S_2$ ... $S_j$ are Fibonacci elements corresponding to the optical fiber of FIG. 4A above. FIG. 5 illustrates schematically an example of how the $6^{th}$-order Fibonacci arrays of waveguiding cores (FAWC6) can be constructed. It is noted that the arrays of waveguiding cores may not need to be linear, and may be arranged in the same sequence along but along a curve—i.e., ring-type fashion, as described and shown herein, however the sequence(s) of fiber core arrangement when the waveguiding cores are arranged so as to forming ring distribution 140 will be similar.

FIG. 6 is a diagram of $6^{th}$ order Fibonacci arrays of waveguiding cores (FAWC6) composed by two types of waveguiding cores 120, 130. More specifically the plurality of waveguiding cores in this embodiment comprise single mode waveguiding cores A (smaller circles, corresponding to the waveguiding cores 120) and B (larger circles, corresponding to the waveguiding cores 130).

Figure 7A:
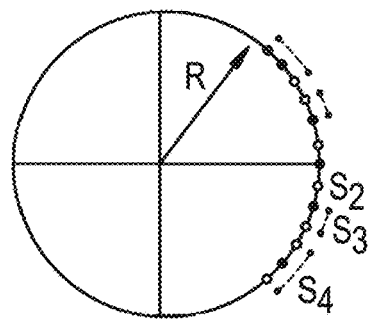
FIG. 7A illustrates construction of the core ring distribution in $4^{th}$ order Fibonacci multicore ring fiber (FMCRF4)
Figure 7B:
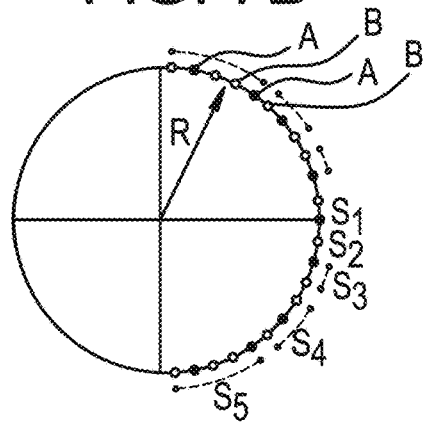
FIG. 7B illustrate construction of the core ring distribution in $5^{th}$ order Fibonacci multicore ring fiber (FMCRF5)
Figure 7C:
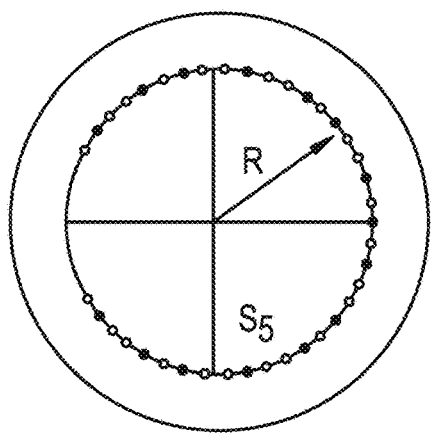
FIG. 7C illustrate construction of the core ring distribution in $6^{th}$ order Fibonacci multicore ring fiber (FMCRF6)

FIGS. 7A and 7B illustrate construction of the core ring distribution 140 in $4^{th}$ order Fibonacci multicore ring fiber 101 (FMCRF4) and $5^{th}$-order Fibonacci multicore ring fiber 101 (FMCRF5), respectively. The ring of cores is symmetrical with two arms each is constructed as described in FIG. 6 above. FIG. 7C illustrates a cores ring distribution 140 in $6^{th}$ order Fibonacci multicore ring fiber 101 (FMCRF6) that comprises 39 waveguiding cores.

It is clear from FIGS. 7A-7C that the core rings constructed with Fibonacci sequences of two different SM (single mode) waveguiding cores A and B are on-diagonal quasi-periodic, due to the Fibonacci distributions of propagation constants $\beta_A$ and $\beta_B$. (For example, when the waveguiding cores A and B correspond to the waveguiding cores 120, 130, respectively, $\beta_A = b_1$ and $\beta_B = b_2$, where $b_1$ is the propagation constant of the first waveguiding core 120, $b_2$ is the propagation constant of the second waveguiding core 130.) The coupling coefficients between the nearest waveguiding cores are the functions of the overlapping between the modes and the propagation constants of these waveguiding cores. Consequently, the coupling coefficients in the multicore ring fibers 101 (for example Fibonacci Multicore Ring Fibers (FMCRFs) disclosed herein) also have quasi-periodic—or deterministically disordered distribution. Therefore, FMCRFs advantageously provide platforms having both on- and off-diagonal deterministic disorders for realizing LQWs deterministically (e.g., both propagation constants and coupling coefficients are quasi-periodic). That is, multicore ring fibers (MCRFs) shaving waveguiding cores situated in a ring distribution constructed with a Fibonacci sequence with two different waveguiding cores result in both propagation constants and coupling coefficients are quasi-periodic or deterministically disordered distributions.

Figure 8A:
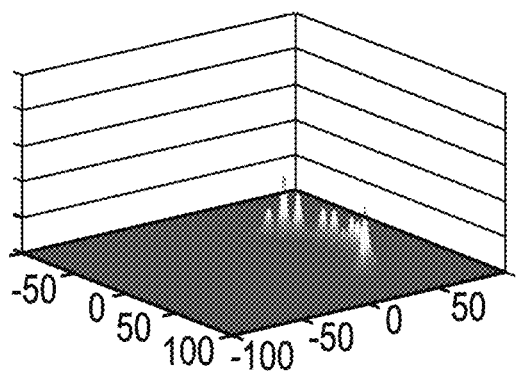
FIGS. 8A-8C illustrate simulation results of probability distribution of photons in quantum walks in multicore optical fibers with a core ring distribution, where the core comprises 15 waveguiding cores, 23 waveguiding cores and waveguiding 39 cores, respectively.
Figure 8B:
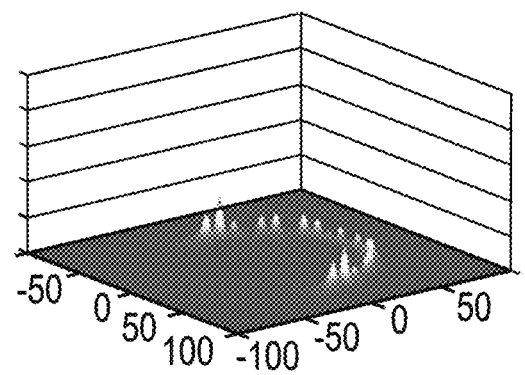
Figure 8C:
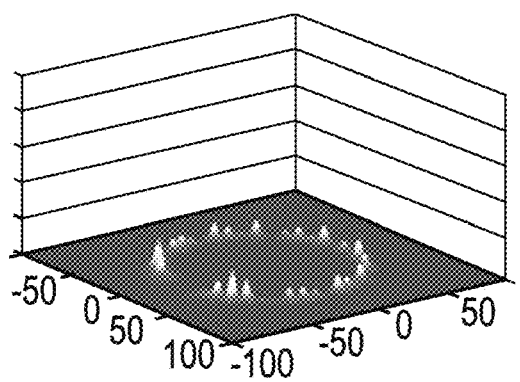

FIGS. 8A-8C illustrate simulation results of probability distribution of photons in quantum walks in multicore optical fibers with a core ring distribution that is periodic (similar to that of fiber of FIG. 3A, but comprising: a) 15 waveguiding cores (FIG. 8A), b) 23 cores (FIG. 8B), and c) 39 cores (FIG. 8C). More specifically, FIGS. 8A-8C show that probability distribution of QWs in periodic MCRF with photons spread across the lattice by coupling from one waveguiding core to the adjacent waveguiding core in a pattern characterized by two strong lobes.

Figure 8D:
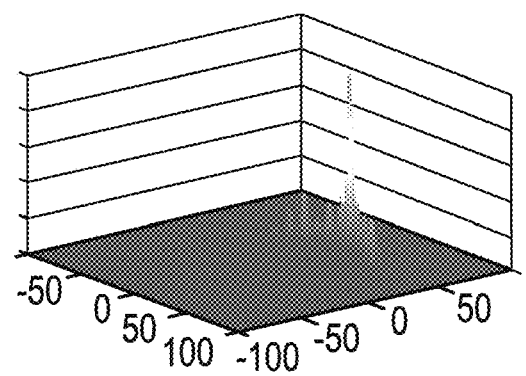
FIG. 8D illustrates simulation results of probability distribution of photons in quantum walks win a system comprising $4^{th}$ order Fibonacci multicore ring fiber (FMCRF4) with 15 waveguiding cores.
Figure 8E:
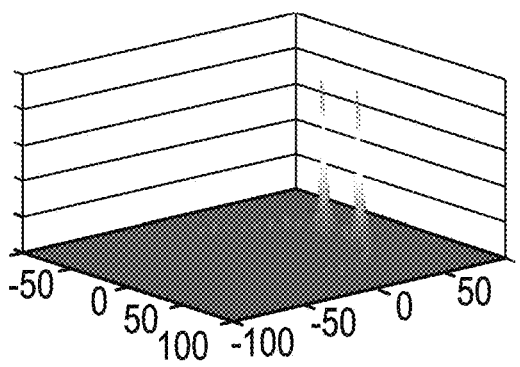
FIG. 8E illustrates simulation results of probability distribution of photons in quantum walks win a system comprising $5^{th}$ order Fibonacci multicore ring fiber (FMCRF5) with 23 cores.
Figure 8F:
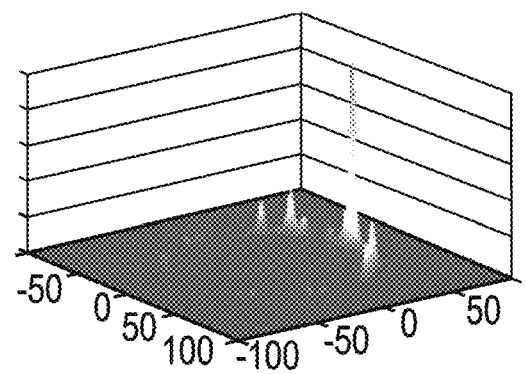
FIG. 8F illustrates simulation results of probability distribution of photons in quantum walks win a system comprising $6^{th}$ order Fibonacci multicore ring fiber (FMCRF6) with 39 cores.

The results for optical fiber with the waveguiding cores arranged in ring distribution that has a quasi-periodic sequence are structurally different. For example, LQWs are clearly shown in quasi-periodic Fibonacci multicore ring fibers (FMCRFs). Furthermore, symmetrical distributions of LQWs in FMCRFs can be achieved due to the symmetry of the quasi-periodic ring of cores in FMCRFs. FIGS. 8D-8E illustrate simulation results of probability distribution of photons in quantum walks in with Fibonacci multicore ring fibers 101 that have d) 15 waveguiding cores (FMCRF4, see FIG. 8D), e) 23 waveguiding cores (FMCRF5, see FIG. 8E), and f) with 39 waveguiding cores (FMCRF6, see FIG. 8F).

Note that quantum walks multicore fiber with a periodic core ring distribution (e.g., fiber of FIG. 3A) have photons spread across the lattice by coupling from one waveguiding core to its neighboring waveguiding core(s) in a pattern characterized by two strong lobes, as in normal quantum walks on a line. However, the results for quasi-periodic core ring multicore optical fibers 101 (e.g., Fibonacci multicore ring fibers) are different: localized quantum walks are clearly demonstrated in Fibonacci multicore ring fibers. Furthermore, symmetrical distributions of LQWs in FMCRFs can be achieved due to the symmetry of the quasi-periodic ring of cores, for example in FMCRFs.

Design of Multicore Ring Fibers (MCRFs)

The design of MCRFs with a periodic core ring distribution is shown, for example, in FIG. 3A. In this multicore ring fiber all the single mode waveguiding cores are regularly placed in two identical arms of a ring, with central waveguiding core being an input core is for input signal coupling. The fiber design shown in FIG. 3a has the following features:
1. Fiber cores (i.e., the waveguiding cores) have mode field diameters (MFDs) close (e.g., within 10%) to that of single mode fiber for easy coupling to the single mode input fiber.
2. If desired, two end-cores in two arms A1, A2 of core ring are spaced far enough apart by a distance Dx, in order to avoid coupling between the two end-cores that would distort distribution of the normal quantum walks in line, which do not have such interaction.
3. Fiber cladding should not too close core ring to avoid reflection at the boundary between the cladding and fiber jacket or air surrounding the cladding. The reflection is very small but could cause some distortion if cladding is too thin and close to the core ring.

The fiber design of the optical fibers 101 with the quasi-periodic core ring distribution, for example FMCRFs (is be similar as that for MCFs described above, but, the core ring distribution 140 of the fibers having a plurality of cores are arranged in a ring distribution that is quasi-periodic, e.g., ring distribution that is based on Fibonacci sequences, Rudin-Shapiro, or Thue-Morse sequence. The core ring distribution 140 may is comprised of at least two arms (for example two symmetrical arms A1, A2). For example, each arm of the core ring distribution 140 may be constructed with Fibonacci sequences of waveguiding cores as described herein and shown, for example, in FIGS. 2, 2A-C and 4A-4B, and 7.

Fabrication of MCRFs

One exemplary fabrication method of MCRFs (e.g. FMCRFs) includes fabricating cylindrical rods of cladding glass having a top (flat) surface, drilling bores in the direction orthogonal to the flat surface, and inserting continuous core canes into the bore holes, forming a multi-core preform, and then drawing multi-core preform into a multi-core fiber. Another exemplary fabrication method of MCRFs (e.g., FMCRFs) includes fabricating a cladding glass preform with the elongated holes capable of receiving core rods, inserting core canes into the holes, consolidating the cladding glass around the core rods, thereby forming a multi-core preform, and then drawing multi-core preform into a multi-core fiber. Other methods of forming the multicore fibers can also be utilized.

Set-Up and Measurement

The MCRF (both periodic and FMCRF) with 39 single mode cores were characterized using a cross-polarization microscopy. The microscopy system is a Nikon, high magnification optical microscope with error of ±0.5 μm. The average core diameter measured is ~4.40 μm and 4.55 μm for MCF and FMCF respectively. The average distance from center-to-center of neighboring cores is ~16.89 μm and ~16.80 μm for periodic MCRF (similar to that of FIG. 3A) and FMCRF respectively. The index observed from crossed-polarization indicate that the periodic MCF have identical refractive index for all of cores, whereas the FMCF have different core refractive indices grouped as described in previous sections. The core ring radius r is approximately ~120 μm and fiber cladding outer radius is approximately ~158 μm.

Figure 9:
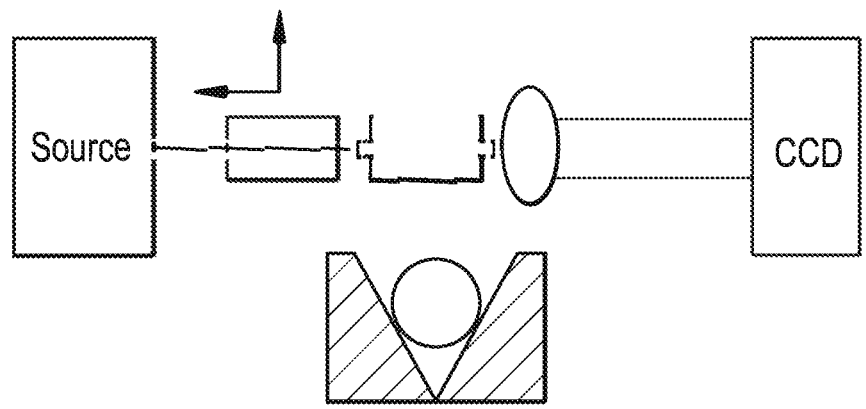
FIG. 9 illustrates schematically a system including a photon generator (source), a multicore optical fiber, and a photon detector, according to one or more embodiments shown and described herein.
Figure 10:
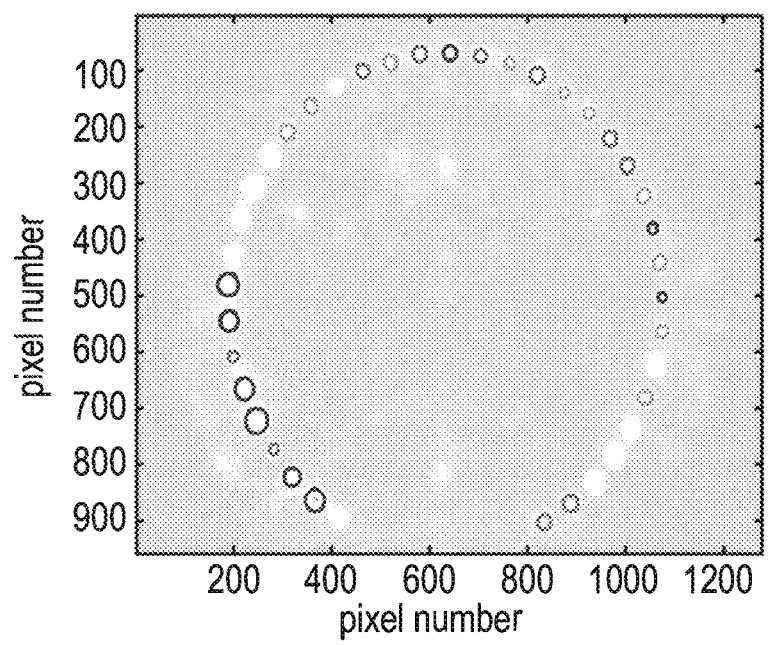
FIG. 10 illustrates an exemplary image provided by an of algorithm for detecting location of the waveguiding cores, according to one or more embodiments shown and described herein.

Demonstration of quantum walks in MCRFs and FMCF were conducted with a stripped fiber, at approximately 4-cm length. The fiber is placed on a v-groove in an imaging system shown in FIG. 9. A tunable source from 1510-1590 nm laser illuminates the multicore ring fiber 101 The steps taken to identify the central ($20^{th}$) core and measured the quantum walk distribution is as follows:
1.) Illuminate subsections of the fiber of interest (FOI) such that waveguiding cores are illuminated.
2.) Combine illumination images to identify the position of each waveguiding core using Matlab/Labview algorithms to identify circular objects and, for example draw the circle around the object as shown in FIG. 10. More specifically, FIG. 10 illustrates a sample image of algorithm detecting location of each cores. Circles are drawn around each waveguiding core's location.
3.) Extract position of the central core ($20^{th}$ Core).
4.) Illuminate the central core by butt-coupling with an single mode fiber that is mode-matched to the MCRF cores.
5.) Capture image of signals.
6.) Repeat steps 4-5 for wavelength sweep from 1530-1559 nm to account for fiber length variations.
7.) Calculate the total intensity within the MFD of each waveguiding core, for example by utilizing either a Matlab algorithm or another applicable software, Experimentally, we have demonstrated quantum walks in at least two types of quantum systems: quantum systems that utilize ordered periodically arranged multiple waveguiding cores, quantum systems comprising ordered and quasi-periodic arrays of cores or deterministically disordered array of waveguiding cores. The ordered system, MCRF, showed distributions of that expected for a quantum walk distribution. On the hand, the FMCRF, a quasi-periodic or deterministically disordered system, shows localization as predicted by our simulation. However, the system can be further improved as the tolerance for misalignment, surface roughness, reflection by air/cladding interface is quite strong especially for the FMCRF. Misalignment, roughness, air/cladding interfaces may cause distortion and unwanted localization and interferences in the fiber. These issues can be resolved using index matching oil to reduce reflection at the interface between cladding and air. To achieve a short-length fiber with minimal roughness to the end faces from bad cleaving or from unwanted back-reflection from flat end faces, we fabricated a housing unit for the fiber made of angled-ferrules and/or canes filled completely or in part with index-matching oil and high-refractive index adhesive. The ferrules are polished at angle or flat depending on tolerance for back-reflection.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A multicore optical fiber comprising:
   a cladding,
   a plurality of cores disposed in a cladding, wherein:
      the plurality of cores comprise one or more first waveguiding cores and one or more second waveguiding cores;
      the one or more first waveguiding cores comprise a first propagation constant, the one or more second waveguiding cores comprise a second propagation constant, and the first propagation constant is different than the second propagation constant;
      the one or more first waveguiding cores and the one or more second waveguiding cores are disposed in the cladding in a ring distribution and at least a portion of the ring distribution is arranged based on a quasi-periodic sequence comprising a plurality of sequence segments, wherein:
         each sequence segment is determined based on a quasi-periodic function;
         each sequence segment comprises an order; and
         each sequence segment corresponds to an arrangement segment of one or more first waveguiding cores, one or more second waveguiding cores, or a combination thereof; and
      the ring distribution of the first and second waveguiding cores disposed in the cladding comprises at least one arrangement segment corresponding with a third-order sequence segment or higher of the quasi-periodic sequence.

2. The multicore optical fiber of claim 1, wherein at least a portion of the ring distribution comprises adjacent arrangement segments corresponding with a first-order sequence segment through a fifth-order sequence segment of the quasi-periodic sequence.

3. The multicore optical fiber of claim 1 wherein at least a portion of the ring distribution comprises adjacent arrangement segments corresponding with at least the third-order sequence segment and a fourth-order sequence segment of the quasi-periodic sequence.

4. The multicore optical fiber of claim 1, wherein the third-order sequence segment of the quasi-periodic sequence corresponds to an arrangement segment comprising at least one first waveguiding cores and at least one second waveguiding cores.

5. The multicore optical fiber of claim 1, wherein:
   the quasi-periodic sequence comprises a Fibonacci sequence;
   the quasi-periodic function of the Fibonacci sequence comprises $S_{N+1} = S_{N-1} S_N$; and
   $S_N$ comprises a sequence segment of an N-order and corresponds to an N-order arrangement segment.

6. The multicore optical fiber of claim 5, wherein:
$S_1$=A, wherein A comprises a first-order sequence segment and corresponds to a first-order arrangement segment comprising an individual first waveguiding cores;
$S_2$=B, wherein B comprises a second-order sequence segment and corresponds to a second-order arrangement segment comprising an individual second waveguiding cores;
$S_3$=$S_1S_2$=AB, wherein AB comprises the third-order sequence segment and corresponds to a third-order arrangement segment comprising the first-order arrangement segment adjacent the second-order arrangement segment; and
$S_4$=$S_2S_3$=BAB, wherein BAB comprises a fourth-order sequence segment and corresponds to a fourth-order arrangement segment comprising the second-order arrangement segment adjacent the third-order arrangement segment.

7. The multicore optical fiber of claim 1, wherein:
the quasi-periodic sequence comprises a Thue-Morse sequence;
the quasi-periodic function of the Thue-Morse sequence comprises $T_{N+1}=T_N\overline{T_N}$;
$T_N$ comprises a sequence segment of an N-order and corresponds to an N-order arrangement segment; and
$\overline{T_N}$ comprises a sequence segment of the Boolean complement of the $T_N$ sequence segment and corresponds to the Boolean complement of the N-order arrangement segment.

8. The multicore optical fiber of claim 7, wherein
$T_1$=A, wherein A comprises a first-order sequence segment and corresponds to a first-order arrangement segment comprising an individual first waveguiding cores;
$T_2$=B, wherein B comprises a second-order sequence segment and corresponds to a second-order arrangement segment comprising an individual second waveguiding cores;
$T_3$=$\overline{T_2}$=BA, wherein BA comprises the third-order sequence segment and corresponds to a third-order arrangement segment comprising the second-order arrangement segment adjacent the Boolean complement of the second-order arrangement segment; and
$T_4$=$T_3\overline{T_3}$=BAAB, wherein BAAB comprises a fourth-order sequence segment and corresponds to a fourth-order arrangement segment comprising the third-order arrangement segment adjacent the Boolean complement of the third-order arrangement segment.

9. The multicore optical fiber of claim 1, wherein:
the quasi-periodic sequence comprises a Rudin-Shapiro sequence;
the quasi-periodic function of the Rudin-Shapiro sequence comprises a four-element substitution sequence where P→PQ, Q→PR, R→SQ, and S→SR, such that:
$S_1$=P;
$S_2$=PQ;
$S_3$=PQPR
$S_4$=PQPRPQSQ; and
$S_5$=PQPRPQSQPRSRPR wherein the four-element substitution sequence is mapped onto a two element sequence where (P,Q)→A and (R,S)→B, each instance of A corresponds to an individual first waveguiding core and each instance of B corresponds to an individual second waveguiding core such that:

$S_1$=A, wherein $S_1$ is a first-order sequence segment and corresponds to a first-order arrangement segment that comprises A;
$S_2$=AA, wherein $S_2$ is a second-order sequence segment and corresponds to a second-order arrangement segment that comprises AA;
$S_3$=AAAB, wherein $S_3$ is the third-order sequence segment and corresponds to a third-order arrangement segment that comprises AAAB;
$S_4$=AAABAABA, wherein $S_4$ is a fourth-order sequence segment and corresponds to a fourth-order arrangement segment that comprises AAABAABA; and
$S_5$=AAABAABAABBBAB, wherein $S_5$ is a fifth-order sequence segment and corresponds to a fifth-order arrangement segment that comprises AAABAABAABBBAB.

10. The multicore optical fiber of claim 1, wherein the plurality of cores comprise single mode waveguiding cores.

11. The multicore optical fiber of claim 1, wherein:
the one or more first waveguiding cores comprise a first V-number $V_1$ and the one or more second waveguiding cores comprise a second V-number $V_2$;

$$V_1 = (2\pi a_1)\left(\frac{NA_1}{\lambda}\right), \text{ where } NA_1 = (n_{WG1} - n_{CLAD})^{\frac{1}{2}},$$

$n_{WG1}$ is the refractive index of the one or more first waveguiding core, $n_{CLAD}$ is the refractive index of the cladding, $a_1$ is a radius of the one or more first waveguiding core, and λ is the wavelength of one or more photons propagating along the one or more first waveguiding core;

$$V_2 = (2\pi a_2)\left(\frac{NA_2}{\lambda}\right), \text{ where } NA_1 = (n_{WG1} - n_{CLAD})^{\frac{1}{2}},$$

$n_{WG2}$ is the refractive index of the one or more second waveguiding core, $n_{CLAD}$ is the refractive index of the cladding, $a_2$ is a radius of the one or more second waveguiding core, and λ is the wavelength of one or more photons propagating along the plurality of waveguiding cores; and
$V_1 \neq V_2$.

12. The multicore optical fiber of claim 1, wherein:
the plurality of waveguiding cores are uniformed spaced in the ring distribution; and
a spacing distance D' between each adjacent pair of waveguiding cores in the plurality of waveguiding cores comprises about 30 μm or less.

13. The multicore optical fiber claim 1, wherein:
the plurality of waveguiding cores comprises a central waveguiding comprising a first waveguiding core;
a first section of the ring distribution extends in a first direction from the central waveguiding core and comprises at least one arrangement segment corresponding with the third-order sequence segment or higher of the quasi-periodic sequence; and
a second section of the ring distribution extends in a second direction from the central waveguiding core and comprises at least one arrangement segment corresponding with the third-order sequence segment or higher of the quasi-periodic sequence.

14. The multicore optical fiber of claim 1, wherein:
the plurality of cores comprises a pair of adjacent central waveguiding cores each comprising a first waveguiding core;
a first section of the ring distribution extends in a first direction from a first central waveguiding core and comprises at least one arrangement segment corresponding with a fourth-order sequence segment of the quasi-periodic sequence or higher; and
a second section of the ring distribution extends in a second direction from a second central waveguiding core and comprises at least one arrangement segment corresponding with the fourth-order sequence segment of the quasi-periodic sequence or higher.

15. A system comprising:
the multicore optical fiber of claim 1;
a photon generator optically coupled to an input end of at least one waveguiding core of the plurality of cores; and
one or more photon detectors optically coupled to an output end of at least one waveguide of the plurality of cores.

16. A system comprising:
the multicore optical fiber of claim 1;
a photon generator optically coupled to an input end of at least one core of the plurality of cores; and
one or more photon detectors optically coupled to an output end of at least one waveguide of the plurality of cores.

17. The system of claim 16, wherein the photon generator is optically coupled to the input end of the central waveguiding core of the plurality of cores.

18. The system of claim 16, wherein:
the photon generator comprises a first photon generator optically coupled to the input end of an individual waveguiding core directly adjacent the central waveguiding core in the first direction; and
a second photon generator is optically coupled to the input end of an individual waveguiding core directly adjacent the central waveguiding core in the second direction.

19. A system comprising:
the multicore optical fiber of claim 14;
a first photon generator optically coupled to an input end of the first central waveguiding core of the plurality of waveguiding cores;
a second photon generator optically coupled to the input end of the second central waveguiding core of the plurality of waveguiding cores; and
one or more photon detectors optically coupled to an output end of at least one waveguiding core of the plurality of waveguiding cores.

20. A method of determining a photon probability distribution, the method comprising:
directing a plurality of photons generated using a photon generator into an input end of an individual waveguiding core of a multicore optical fiber, wherein the multicore optical fiber comprises:
a cladding;
a plurality of waveguiding cores disposed in the cladding, wherein:
the plurality of waveguiding cores comprise one or more first waveguiding core and one or more second waveguiding core;
the one or more first waveguiding cores comprise a first propagation constant, the one or more second waveguiding cores comprise a second propagation constant, and the first propagation constant is different than the second propagation constant;
the one or more first waveguiding cores and the one or more second waveguiding cores are disposed in the cladding in a ring distribution and at least a portion of the ring distribution is arranged based on a quasi-periodic sequence comprising a plurality of sequence segments, wherein:
each sequence segment is determined based on a quasi-periodic function;
each sequence segment comprises an order; and
each sequence segment corresponds to an arrangement segment of one or more first waveguiding core, one or more second waveguiding core, or a combination thereof; and
the ring distribution of the first and second waveguiding cores disposed in the cladding comprises at least one arrangement segment corresponding with a third-order sequence segment or higher of the quasi-periodic sequence;
receiving the plurality of photons using a plurality of photon detectors, wherein each of the plurality of photon detectors is optically coupled to an output end of at least one of the plurality of cores; and
determining a photon probability distribution based on the plurality of photons received by the plurality of photon detectors.

* * * * *

UNITED STATES PATENT AND TRADEMARK OFFICE
CERTIFICATE OF CORRECTION

| | |
|---|---|
| PATENT NO. | : 11,137,539 B2 |
| APPLICATION NO. | : 17/034014 |
| DATED | : October 5, 2021 |
| INVENTOR(S) | : Borrelli et al. |

It is certified that error appears in the above-identified patent and that said Letters Patent is hereby corrected as shown below:

In the Claims

In Column 23, Line 40, Claim 8, delete "$T_2$" and insert -- $T_2 \overline{T}_2$ --, therefor.

In Column 23, Line 59, Claim 9, delete "PQPR" and insert -- PQPR; --, therefor.

In Column 24, Line 55, Claim 13, after "fiber" insert -- of --.

Signed and Sealed this
Fifteenth Day of August, 2023

Katherine Kelly Vidal
*Director of the United States Patent and Trademark Office*